US007990438B2

(12) United States Patent
Kamo

(10) Patent No.: US 7,990,438 B2
(45) Date of Patent: Aug. 2, 2011

(54) IMAGING APPARATUS ADAPTED TO IMPLEMENT ELECTRICAL IMAGE RESTORATION PROCESSING

(75) Inventor: Yuji Kamo, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 420 days.

(21) Appl. No.: 12/006,764

(22) Filed: Jan. 4, 2008

(65) Prior Publication Data
US 2008/0165261 A1 Jul. 10, 2008

(30) Foreign Application Priority Data

Jan. 9, 2007 (JP) ................................ 2007-001357

(51) Int. Cl.
*H04N 5/262* (2006.01)
(52) U.S. Cl. ............. 348/240.3; 348/208.4; 348/208.11; 348/340; 348/335; 359/554
(58) Field of Classification Search ............... 348/240.3, 348/344, 208.4, 208.7, 208.8, 208.11, 340, 348/335, 338; 396/111, 114
See application file for complete search history.

(56) References Cited

U.S. PATENT DOCUMENTS

| 7,609,313 | B2 * | 10/2009 | Yamaguchi et al. ........... 348/335 |
| 7,652,688 | B2 * | 1/2010 | Kuroda ..................... 348/208.11 |
| 2004/0057712 | A1 * | 3/2004 | Sato et al. ........................ 396/89 |
| 2004/0130652 | A1 * | 7/2004 | Sasaki et al. ................... 348/349 |
| 2004/0174613 | A1 * | 9/2004 | Noda ............................. 359/691 |
| 2004/0218813 | A1 * | 11/2004 | Okada et al. ................... 382/167 |

FOREIGN PATENT DOCUMENTS

| JP | 2000-20691 | 1/2000 |
| JP | 2000020691 A * | 1/2000 |

OTHER PUBLICATIONS

"Image Processing (Image Processing Standard Textbook)", first edition/first copy: Feb. 25, 1997; first edition/fourth copy: Jul. 24, 2001, Computer Graphic Arts Society, pp. 1-3.
Satoshi Kawata, "Introduction to Data Processing for Science Measurement," first edition: Jan. 10, 2002, second edition: May 15, 2002, pp. 1-5.
S.H.M. Allon et al., "Fast Deblurring Algorithms," pp. 1-25.

* cited by examiner

*Primary Examiner* — Jason Chan
*Assistant Examiner* — Usman Khan
(74) *Attorney, Agent, or Firm* — Kenyon & Kenyon LLP

(57) ABSTRACT

The invention relates to an imaging apparatus that makes effective use of an image restoration processing method, thereby working favorably for size reductions while making sure zoom ratios and brightness, and ensuring good images. The imaging apparatus includes a zoom lens 1 comprising a plurality of lens groups G1 to G4 and adapted to implement zooming from a wide-angle end to a telephoto end with a change in a space between the plurality of lens groups, an imaging device 2 adapted to take an image formed through the zoom lens 1, and an image restoration processor 11 adapted to implement signal processing by which image restoration is implemented on the basis of a signal for the image taken by the imaging device 2 to generate an image signal for a restored image. The signal processing for implementing image restoration at the image restoration processor 15 involves processing for electrically implementing image restoration using a restoration filter on the basis of a point spread function regarding the imaging capability of the zoom lens 1. The zoom lens and the imaging device have a relation that satisfies condition (1) for balancing the power of restoration at the image restoration processor 11 against the total length of the zoom lens 1.

22 Claims, 12 Drawing Sheets

IMAGING APPARATUS ADAPTED TO IMPLEMENT ELECTRICAL IMAGE RESTORATION PROCESSING

BACKGROUND OF THE INVENTION

The present invention relates to an imaging apparatus adapted to electrically implement image restoration processing.

It is known that when an object that provides a subject is formed on the imaging plane of an imaging device by way of an optical system such as a zoom lens, the image taken by the imaging device is more blurred by the influences of aberrations of the optical system than the original object: it is poorer in image quality.

The intensity distribution g of the then image is represented by g=f*h+n (*: convolution integral) (A) where noise n is added to the convolution of the luminance distribution f of the original object and the point spread function (PSF for short) that is indicative of the imaging capability of the optical system. The elements g, h and n being already known, the luminance distribution f of the original object may be figured out of Eq. (A).

The technique of deblurring the optical system by signal processing to obtain an ideal image is called the image "restoration or deconvolution".

A typical prior art of applying such image restoration to a digital camera is known from Patent Publication 1.

Patent Publication 1 sets forth an image processing method wherein, on the basis of a signal (for an image taken by an imaging apparatus (for instance, a blurred image), a restoration filter based on a point spread function is applied to image restoration processing while care is taken of information about image deterioration at the taking time, thereby generating a less deteriorated image.

For specific restoration filters, there is the mention of a Wiener filter, a common inverse filter, or the like.

It is described that the restoration filter is generated while taking care of information about image deterioration at the taking time.

It is described that the information of which care is taken includes that analytically found out of physical factors such as taking conditions (exposure time, exposure dose, distances up to subjects, focal lengths, etc.) and performance information of the imaging apparatus (optical characteristics of lenses, identification information of the imaging apparatus, etc.) or estimated out of the outputs of measuring devices such as acceleration sensors or the like.

Such Wiener filters and common inverse filters as mentioned above are also referred to in Non-Patent Publication 1.

Other than the methods using such restoration filters, computation methods capable of implementing electrical image restoration processing using a restoration filter based on a point spread function are known as the maximum entropy method from Non-Patent Publication 2, and as the Tikhonov-Miller method, the Richardson-Lucy method, the Van Cittert method and the Landweber method from Non-Patent Publication 3.

In the digital camera field, on the other hand, preference is now being given to the small-format, slimmed-down type. Of camera size, the thickness direction has larger influences on optical system size; the arrangement of an optical system gets more important to achieve slimness.

There is also a mounting need for a high-zoom-ratio optical system arrangement having a zooming function capable of inducing large changes in the angle of view.

There is further a growing need for a small F-number, fast optical system capable of receiving a lot more light.

Patent Publication 1

JP(A) 2000-20691

Non-Patent Publication 1

"Image Processing" published by the CG-ARTS Association

Non-Patent Publication 2

"An Introduction to Data Processing for Scientific Instrumentation and Measurement" edited and written by Satoshi Kawada under the supervision of Shigeo Minami Non-Patent Publication 3

"Fast Deblurring Algorithms" edited by S. H. M Allon, M. G. Debertrand and B. T. H. M. Sleutjes, the Internet.

A problem with efforts to meet such needs for an optical system, however, is that the optical system tends to get bulky due to the need of making sure optical performance.

The reasons are that when there is a high-zoom-ratio arrangement provided, the imaging apparatus tends to get bulky so as to make sure the amount of movement of lens groups; when there is a small F-number arrangement provided, there are large aberrations occurring, making the PSF worse; and efforts to correct such aberrations at the optical system itself work against compactness because of the need of using a lot more lenses for correction of aberrations.

The prior arts showing such image restoration methods as mentioned above are troublesome to operators, because images taken by the imaging apparatus must once be written in recording media and then subjected to signal processing outside the imaging apparatus.

The aforesaid prior arts say nothing about the optimum arrangement of an optical system underlying such image processing, although they disclose electrical image restoration processing.

SUMMARY OF THE INVENTION

In view of such problems with the prior art, the invention has for its object the provision of an imaging apparatus that makes effective use of the aforesaid image restoration processing methode, thereby favorably for size reductions while making sure zoom ratios and brightness, and ensuring that satisfactory images are obtainable.

Specifically, the invention provides an imaging apparatus adapted to implement electrical image restoration processing, characterized by comprising:

a zoom lens comprising a plurality of lens groups and adapted to implement zooming from a wide-angle end to a telephoto end with a change in a space between said plurality of lens groups, an imaging device having an imaging plane located at a position where an image formed by said zoom lens is received at, and adapted to take said image, and an image restoration processor adapted to implement signal processing by which image restoration is implemented on the basis of a signal for the image taken by said imaging device to generate an image signal for a restored image, wherein:

the signal processing for implementing said image restoration at said image restoration processor involves processing for electrically implementing image restoration using a restoration filter on the basis of a point spread function regarding the imaging capability of said zoom lens, and said zoom lens and said imaging device have a relation that satisfies the following condition (1):

$$2<(L\cdot f_w\cdot\sqrt{Fno})/(f_t\cdot Ih)<7 \quad (1)$$

where:

L is an axial maximum length from the refracting surface of the zoom lens nearest to the object side to the imaging plane, $f_w$ is the focal length of the whole zoom lens system at the wide-angle end, $f_t$ is the focal length of the whole zoom lens system at the telephoto end, Fno is a minimum F-number at the telephoto end, and Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

The invention also provides an imaging apparatus adapted to implement electrical image restoration processing, characterized by comprising:

a zoom lens comprising a plurality of lens groups and adapted to implement zooming from a wide-angle end to a telephoto end with a change in a space between said plurality of lens groups, an imaging device having an imaging plane located at a position where an image formed by said zoom lens is received at, and adapted to take said image, and an image restoration processor adapted to implement signal processing by which image restoration is implemented on the basis of a signal for the image taken by said imaging device to generate an image signal for a restored image, wherein:

the signal processing for implementing said image restoration at said image restoration processor involves processing for electrically implementing image restoration using a restoration filter on the basis of a point spread function regarding the imaging capability of said zoom lens, and said zoom lens and said imaging device have a relation that satisfies the following condition (2):

$$5<f_{GPmax}\cdot Fno/Ih<15 \quad (2)$$

where:

$f_{GPmax}$ is the focal length of a lens group of the plurality of lens groups in the zoom lens, wherein said lens group has the greatest positive refracting power, Fno is a minimum F-number at the telephoto end, and Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

The advantages of, and the requirements for, the aforesaid arrangements according to the invention are now explained.

The imaging apparatus of the invention comprises a zoom lens that comprises a plurality of lens groups and is adapted to implement zooming from a wide-angle end to a telephoto end with a change in the space between the plurality of lens groups.

Further, the imaging apparatus comprises an imaging device that has an imaging plane located at a position where an image formed by way of the zoom lens is received at and is adapted to take that image.

Furthermore, the imaging apparatus comprises an image restoration processor by which signal processing is implemented to implement image restoration on the basis of an image taken by that imaging device, thereby generating an image signal for a restored image.

The signal processing for implementing image restoration at that image restoration processor involves processing for electrically implementing image restoration using a restoration filter on the basis of a point spread function about the imaging capability of the zoom lens.

Such arrangement facilitates changing a taking angle of view by the zoom lens. To change the taking angle here, it must make sure there is a space between lens groups so that the space between lens groups can be changed beforehand.

Here, making the point spread function (PSF) good by use of the zoon lens alone works against compactness, because of the need of using a lot more lenses or making the space between the lens groups wider.

If, as described with reference to the prior arts, image restoration processing is electrically implemented using a restoration filter on the basis of the point spread function, the invention works favorably for reducing the number of optical elements in the zoom lens or narrowing the variable space between the lens groups in the zoom lens.

Because the restoration filter here is configured on the basis of the point spread function about the imaging capability of the zoom lens, there is a good image obtained with restored image quality; there is a sensible tradeoff between the size reductions and the high performance of the imaging apparatus.

It is the first aspect of the invention that the following condition (1) is added to such basic arrangement with respect to the relationship between the zoom lens and the imaging device.

$$2<(L\cdot f_w\cdot Fno)/(f_t\cdot Ih)<7 \quad (1)$$

where:

L is an axial maximum length from the refracting surface of the zoom lens nearest to the object side to the imaging plane, $f_w$ is the focal length of the whole zoom lens system at the wide-angle end, $f_t$ is the focal length of the whole zoom lens system at the telephoto end, Fno is a minimum F-number at the telephoto end, and Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object. The same will also hold for the conditions to be described later.

The advantages resulting from the satisfaction of condition (1) are now explained. To accomplish the object of the invention, the first aspect of the invention is designed such that the zoom lens is made smaller than heretofore, and residual aberrations likely to occur from this are made up for by electrical image restoration processing using a restoration filter on the basis of the point spread function about the imaging capability of the zoom lens.

To achieve medial to high performance—the object of the invention, care must be taken of the arrangements of the zoom lens, imaging device and imaging processor.

Generally speaking, as there are aberrations occurring in an optical system, the imaging capability for details of an object, viz., high-frequency components gets worse. As an image here gets too worse to resolve, information about such frequency components reduces down to zero. The signal processing for image restoration used herein is tantamount to division in the case of Fourier transform; as the frequency information before image restoration is already down to zero, it will make image restoration theoretically difficult. In other words, there is a certain limit to the restoration power of image restoration means.

On the other hand, the shorter the total length of the zoom lens, the stronger is the power of each of lens groups forming the zoom lens or the more likely residual aberrations are to occur; even with image restoration processing applied, restoration to a good image falls short of expectation.

To put it another way, the amount of frequency component information correlates to the total length of the zoom lens.

Taken altogether, the first aspect of the invention is characterized by the satisfaction of the aforesaid condition (1) so that the power of image restoration at the image restoration processor can be balanced against the total length of the zoom lens.

At the numerator of condition (1), L, $f_w$ and Fno are all elements that are more difficult to optically correct for aberrations with decreasing magnitude.

On the other hand, $f_t$ and Ih at the denominator of condition (1) are all elements that are more difficult to optically correct for aberrations with increasing magnitude.

The satisfaction of at least the lower limit of 2 to condition (1) facilitates making sure the image quality of the original image before image restoration, and works favorably for making sure improvements in image quality by the image restoration processing.

The satisfaction of at least the upper limit of 7 to condition (1), on the other hand, works favorably for a sensible tradeoff between reducing the total length of the zoom lens and making sure image quality performance by image restoration processing while the performances (zoom ratios, brightness, angles of view) of the zoom lens are ensured.

More preferably, condition (1) should be narrowed down to:

$$3<(L \cdot f_w \cdot \sqrt{Fno})/(f_t \cdot Ih)<6 \qquad (1')$$

The satisfaction of condition (1') works more for offering a sensible tradeoff between reducing the imaging apparatus and making sure image quality.

Optionally, only the lower limit or the upper limit of condition (1') may be applied to condition (1).

It is the second aspect of the invention that the following condition (2) is added to the aforesaid fundamental arrangement with respect to the relationship between the zoom lens and the imaging device.

$$5<f_{GPmax} \cdot Fno/Ih<15 \qquad (2)$$

where $f_{GPmax}$ is the focal length of a lens group located in the plurality of lens groups in the zoom lens and having a maximum positive refracting power, Fno is a minimum F-number at the telephoto end, and Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

The advantages resulting from the satisfaction of condition (2) are now explained. In the second aspect of the invention, too, residual aberrations from the zoom lens are corrected by electrically implementing image restoration processing using a restoration filter on the basis of the point spread function, as is the case with the first aspect of the invention.

In the second aspect of the invention, a great deal of importance is attached to aberrations responsible for image deteriorations. There are a variety of aberrations involved, of which chromatic aberration of magnification and distortion may be corrected by image processing adapted to geometrically move an image formed on the imaging device.

However, spherical aberrations, coma, etc. having grave influences on image deteriorations cannot be corrected without using image restoration means taking the aforesaid point spread function into consideration. Note here that image processing by edge enhancement does not use the point spread function of the zoom lens; the processed image is apt to become unnatural as it is viewed on a fragmentally enlarged scale.

The spherical aberrations or comas are largely affected by the powers (refracting powers) of the lens groups; however, if such powers are set depending on the correction capability of the image restoration processor, it is then easy to obtain the image restoration function.

Further, the whole zoom lens system of the invention can have a positive focal length; the occurrence of spherical aberrations and comas throughout the zoom lens has close ties with the power of the lens groups having positive power.

Taken altogether, the second aspect of the invention is characterized by the satisfaction of the aforesaid condition (2) so that the power of image restoration at the image restoration processor is balanced against aberrations at the zoom lens.

At the numerator of condition (2), both $f_{GPmax}$ and Fno are elements that are more difficult to optically correct for aberrations with decreasing magnitude.

On the other hand, Ih at the denominator of condition (2) is an element that is the basis for normalizing the numerator element $f_{GPmax}$.

The satisfaction of at least the lower limit of 5 to condition (1) facilitates making sure the image quality of the original image before image restoration, and works favorably for making sure improvements in image quality by the image restoration processing, because the powers of the lens groups each having positive power are kept small.

The satisfaction of at least the upper limit of 15 to condition (2), on the other hand, works favorably for a sensible tradeoff between reduction sizes due to making sure the powers of the positive-power lens groups (while brightness is ensured) and making sure image quality performance by image restoration processing.

More preferably, condition (2) should be narrowed down to (2'):

$$6<f_{GPmax} \cdot Fno/Ih<12.5 \qquad (2')$$

The satisfaction of condition (2') works more favorably for a sensitive tradeoff between size reductions and making sure image quality.

Only the upper limit or only the lower limit to condition (2') may be applied to condition (2).

According to the first or second aspect of the invention, the image restoration implemented at the image restoration processor may be implemented by the image restoration processing described in the patent and non-patent publications referred to in the "BACKGROUND OF THE INVENTION".

More specifically, the image restoration processing using a restoration filter on the basis of the point spread function about the imaging capability of the zoom lens may be implemented using image restoration by a Wiener filter, image restoration by a common inverse filter, the maximum entropy method, the Tikhonov-Miller method, the Richardson-Lucy method, the Van Cittert method, and the Landweber method.

Besides, given image restoration capable of implementing electrical image restoration using a restoration filter on the basis of the point spread function about the imaging capability of the zoom lens, the image restoration intended herein is achievable.

The signal processing for implementing image restoration at the image restoration processor should preferably involve processing for electrically implementing image restoration by way of deconvolution computation using a restoration filter. This is one computation method for image restoration.

As an example, image restoration processing by a common inverse filter is now explained. Let (x, y) be points on a two-dimensional image represented by variables x, y on a planar image having mutually orthogonal x and y axes, f(x, y) be a function for an ideal image, g(x, y) be a deterioration function (image before image restoration), h(x, y) be the PSF, and n(x, y) be noise. Then, the deterioration function is given by $$g(x, y)=\iint h(x-x', y-y')f(x', y')dx'dy'+n(x, y) \quad (10)$$

Let Fourier transforms for f(x, y), g(x, y), h(x, y) and n(x, y) be F(u, v), G(u, v), H(u, v) and N(u, v), respectively. Then, there is $$G(u, v)=H(u, v)*F(u, v)+N(u, v) \quad (11)$$

where * is convolution.

Suppose here that the restoration filter used at the image restoration processor is B(u, v). Then, by multiplying both sides of that formula by the inverse filter of the PSF, $$B(u, v)=1/H(u, v) \quad (12)$$

it is possible to reconstruct an ideal image in the event there is none of noise. Here suppose the image reconstructed by the inverse filter is F' (u, v). There is $$F'(u, v)=F(u, v)+N(u, v)/H(u, v) \quad (13)$$

By implementing such image signal processing, image restoration may be implemented.

Indeed, there is none of the case where the noise term is down to zero; as H(u, v) takes zero or a value close to zero, it causes the noise term to extend, often ending up with disturbances in the restored image.

In the event there is noise, a Wiener filter may just as well be used for image restoration processing that takes noise into consideration.

This restoration filter is given by $$B(u, v)=H^*(u, v)/\{|H(u, v)|^2+Sn(u, v)/Sf(u, v)\} \quad (14)$$

where H*(u, v) is the complex conjugation of H(u, v), Sn(u, v) is the power spectrum of noise, and Sf(u, v) is the power spectrum of the present image.

With this restoration filter, extreme disturbances by the amplification of noise in the reconstructed image can be reduced as much as possible.

When there is a low imaging capability on the imaging device, the filter processing is preferably implemented by repetitive computation.

That is, the image restoration processing at the image restoration processor preferably involves repetitive computation processing using the aforesaid restoration filter.

The merit of the invention is that image restoration can make up for the collection capability of the zoom lens. In other words, by use of repetitive filter processing, image restoration can be implemented so that good images are easily achievable.

Referring here to what is suitable for such repetitive computation processing, the Van Cittert method is desired in the event there is less noise, and the Landweber method is preferably used in the event there is a relatively lot more noise.

Besides, use may be made of the Richardson-Lucy method or the Tikhonov-Miller method.

The first and second aspects of the invention should preferably be satisfied at the same time.

Some or all of the requirements for each of the aforesaid aspects of the invention should preferably be satisfied at the same time.

Among others, preference is given to such arrangements as mentioned below.

The correction of residual aberrations occurring at the lens groups of positive refracting power with the lens group of negative refracting power works favorably for obtaining good images.

It is thus preferable for the zoom lens to satisfy the following condition:

$$4<|f_{GNmax}\cdot Fno/Ih|<25 \quad (3)$$

where $f_{GNmax}$ is the focal length of a lens group of the plurality of lens groups in the zoom lens, wherein said lens group has the greatest negative refracting power.

By abiding by at least the upper limit of 25 to condition (3), it is possible to make sure the power of the lens group having negative refracting power with ease of correction of spherical aberrations and comas. By abiding by at least the lower limit of 4, it is possible to reduce the power, thereby making it easy to hold back image deteriorations due to overcorrection.

More preferably, condition (3) is narrowed down to:

$$5<|f_{GNmax}\cdot Fno/Ih|<20 \quad (3')$$

The total length of the zoom lens is affected by not only the length of a certain lens group arrangement but also the amount of movement of that lens group arrangement. As the amount of the lens group increases, it causes a cam member for moving the zoom lens to get bulky, often incurring an increase in the size of a lens barrel structure.

To hold back an increase in the lens barrel size, it is preferable for the zoom lens and the imaging device to satisfy the relation defined by the following condition (4):

$$0.5<(D_{zmax}\cdot f_w\cdot Fno)/(f_t\cdot Ih)<2 \quad (4)$$

where $D_{zmax}$ is the amount of movement of a lens group of the plurality of lens groups in the zoom lens, wherein said lens group has the greatest amount of movement upon zooming from the wide-angle end to the telephoto end, $f_w$ is the focal length of the whole zoom lens system at the wide-angle end, and $f_t$ is the focal length of the whole zoom lens system at the telephoto end.

Abiding by at least the upper limit of 2 to condition (4) works favorably for size reductions, because the maximum value for the amount of movement of the lens group is kept small. Abiding by at least the lower limit of 0.5 works favorably for correction of aberrations, because it is possible to make sure the amount of movement of the lens group and diminish the power of each lens group.

More preferably, condition (4) is narrowed down to:

$$0.7<(D_{zmax}\cdot f_w\cdot\sqrt{Fno})/(f_t\cdot Ih)<1.7 \quad (4')$$

It is also preferable for the positive lens having the greatest power to satisfy the following condition (5):

$$0.3<f_{LPmax}\cdot Fno/f_t<2 \quad (5)$$

where $f_{LPmax}$ is the focal length of a positive lens having the greatest positive refracting power in the zoom lens, and $f_t$ is the focal length of the whole zoom lens system at the telephoto end.

Abiding by at least the upper limit of 2 to condition (5) works favorably for size reductions while the power of the positive lens is ensured. Abiding by at least the lower limit of 0.3 makes it easy to hold back-spherical aberrations and comas.

More preferably, condition (5) is narrowed down to:

$$0.45 < f_{LPmax} \cdot Fno/f_t < 1.65 \quad (5')$$

For the zoom lens, it is preferable to include a negative lens that satisfies the following condition (6):

$$0.15 < |f_{LNmax} \cdot Fno/f_t| < 1.65 \quad (6)$$

where $f_{LNmax}$ is the focal length of a negative lens having the greatest negative refracting power in the zoom lens, and $f_t$ is the focal length of the whole zoom lens system at the telephoto end.

Abiding by at least the upper limit of 1.65 to condition (6) makes sure the power of the negative lens, and renders it easy to prevent spherical aberrations and comas from staying undercorrected. Abiding by at least the lower limit of 0.15 reduces the power of the negative lens, and makes it easy to prevent spherical aberrations and comas from staying overcorrected.

More preferably, condition (6) is narrowed down to:

$$0.25 < |f_{LNmax} \cdot Fno/f_t| < 1.5 \quad (6')$$

Preferably, the imaging apparatus of the invention comprises an information holder for holding information on the point spread function about the imaging capability of the zoom lens, and the image restoration processor is adapted to implement image restoration while taking care of the information held in that information holder.

It is preferable for the image processor to contain PSF information beforehand, because the processing speed is fast. Although an optically designed value may be used for the PSF, it is understood that the PSF measured after the assembly of the optical system may also be used. In that case, variations on fabrication of the optical system can be canceled out so that higher performance is achievable.

It is also preferable that depending on the zooming state of the zoom lens, image restoration is implemented with information on varying point spread functions.

With the zoom lens, there are aberration fluctuations occurring from zooming. Consequently, the PSF changes depending on the zooming position. Therefore, it is preferable to use different PSF information for each zooming position upon image restoration processing, because much higher performance is achievable.

Preferably, the imaging apparatus of the invention comprises an information holder for holding information on the point spread function that differs depending on the zooming state of the zoom lens, and the image restoration processor is adapted to implement image restoration while taking care of the information held in that information holder.

If computation is implemented with the PSF corresponding to the zooming state, it is then possible to generate good images with a reduced number of computations.

It is preferable to implement image restoration using information on the point spread function that differs depending on a position on the imaging plane.

The PSF to be processed may be changed depending on an onscreen position. If this is done, image restoration can be more satisfactorily implemented, in which case the same PSF is preferably applied to a certain range, because much faster processing is achievable. Note here that such a range may be either marked off with an arc depending on a distance from the center or divided into rectangles depending on the arrangement of pixels on the imaging device.

Preferably, the imaging apparatus of the invention comprises an information holder for holding information on the point spread function that differs depending on a position on the image plane, and the image restoration processor is adapted to implement image restoration while taking care of the information held in that information holder.

Holding the information beforehand makes computation much faster.

Image restoration may also be implemented using information on point spread functions that differ with the focusing state of the zoom lens.

There are aberration fluctuations occurring from focusing; however, they are held back by changing the PSF to be processed depending on focusing.

Alternatively, the imaging apparatus of the invention comprises an information holder for holding information on the point spread function that differs depending on the focusing state of the zoom lens, and the image restoration processor is adapted to implement image restoration while taking care of the information held in that information holder.

Holding the information beforehand makes computation much faster.

The invention may also be embodied as follows.

The invention provides an imaging apparatus comprising:

a zoom lens comprising, in order from its object side, a first lens group having positive refracting power, a second lens group having negative refracting power, a third lens group having positive refracting power and a fourth lens group having positive refracting power, wherein upon zooming from a wide-angle end to a telephoto end, there is a change in the space between the respective lens groups, an imaging device having an imaging plane located at a position where an image formed by said zoom lens is received at, and adapted to take said image, and an image restoration processor adapted to implement signal processing by which image restoration is implemented on the basis of a signal for the image taken by said imaging device to generate an image signal for a restored image, wherein:

the signal processing for implementing said image restoration at said image restoration processor involves processing for electrically implementing image restoration using a restoration filter on the basis of a point spread function regarding an imaging capability of said zoom lens.

The aforesaid zoom lens works favorably for achieving higher zoom ratios. And then, by correcting the taken image at the aforesaid image restoration processor, it is possible to obtain images of good image quality while make sure high zoom ratios.

The invention also provides an imaging apparatus comprising:

a zoom lens comprising, in order from its object side, a first lens group having negative refracting power, a second lens group having positive refracting power and a third lens group having positive refracting power, wherein upon zooming from a wide-angle end to a telephoto end, there is a change in the space between the respective zoom lens groups, an imaging device having an imaging plane located at a position where an image formed by said zoom lens is received at, and adapted to take said image, and an image restoration processor adapted to implement signal processing by which image restoration is implemented on the basis of a signal for the image taken by said imaging device to generate an image signal for a restored image, wherein:

the signal processing for implementing said image restoration at said image restoration processor involves processing for electrically implementing image restoration using a restoration filter on the basis of a point spread function regarding an imaging capability of said zoom lens.

The aforesaid zoom lens works favorably for size reductions of the imaging apparatus. And then, by correcting a taken image at the aforesaid image restoration processor, it is possible to obtain images of good image quality while the size of the apparatus is reduced.

According to the invention, it is possible to provide an imaging apparatus that makes effective use of image restoration processing, thereby favorably reducing its size while making sure zoom ratios and brightness and achieving good enough images.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The imaging apparatus of the invention adapted to implement electrical image restoration processing is now explained with reference to several examples.

Figure 1:
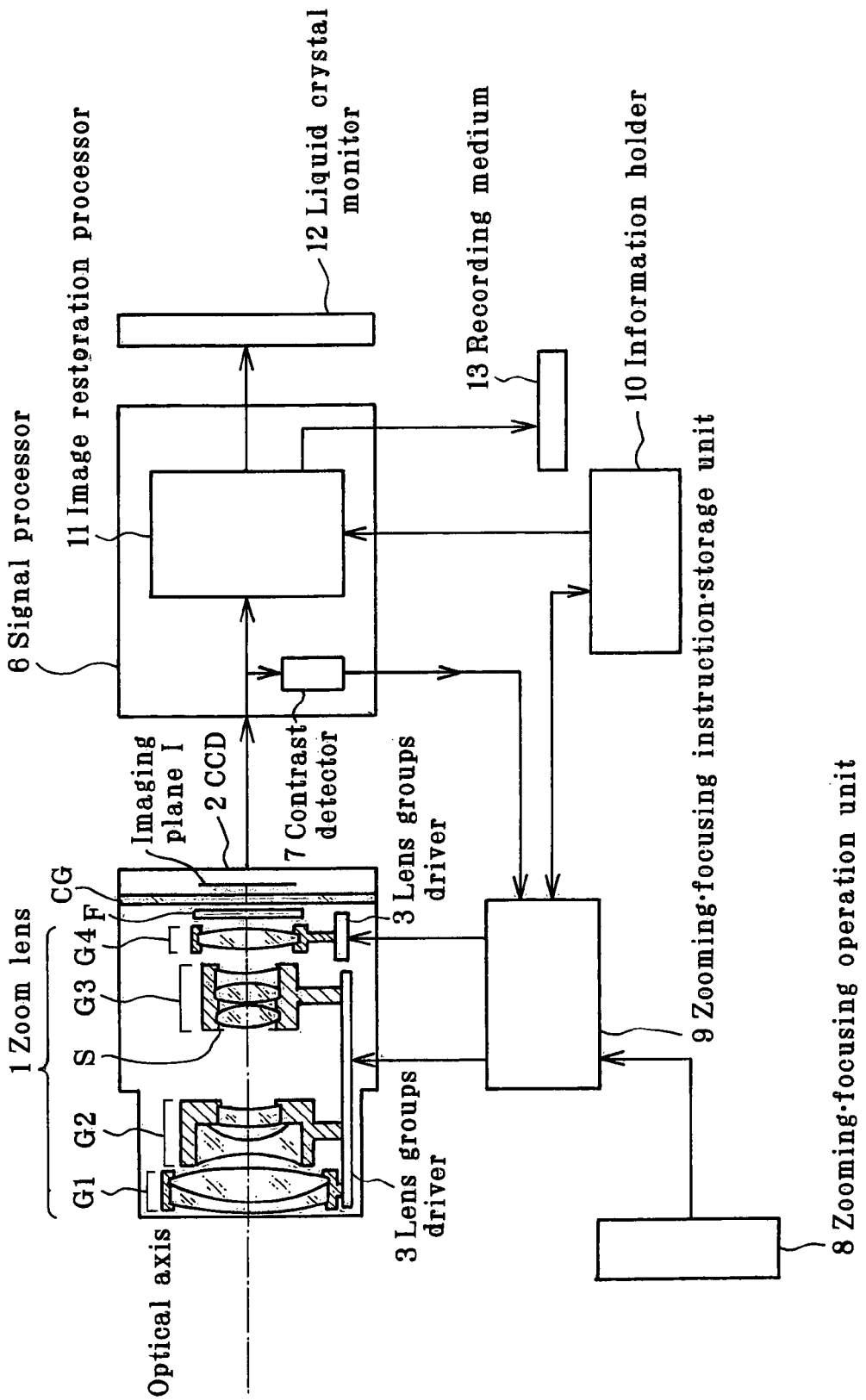
FIG. 1 is illustrative in general schematic of the arrangement of the imaging apparatus according to one embodiment of the invention.

FIG. 1 is illustrative in general schematic of the arrangement of the imaging apparatus according to one example of the invention. As shown, a zoom lens 1 comprises a first lens group G1, a second lens group G2, a third lens group G3 and a fourth lens group G4. On the object side of the third lens group G3, there is an aperture stop S located that moves axially in unison with the third lens group G3. For that zoom lens 1, the zoom lens according to Example 1 to be given later is used. Of course, it is acceptable to use other zoom lens (for instance, a zoom lens of the type that incorporates a reflecting surface for bending an optical path).

Located in the rear of the zoom lens 1 are optical filters F such as an infrared cut filter and a low-pass filter as well as an electronic imaging device 2 (that may be a CCD, a CMOS or the like). On the entrance surface side of CCD 2, there is a cover glass CG located, and light rays passing through the cover glass CG are guided to an imaging plane I of CCD 2 made up of a multiplicity of light receptors.

A lens groups driver 3 moves the respective lens groups G1 to G4 of the zoom lens 1 in the axial direction to implement zooming from the wide-angle end to the telephoto end with a change in the space between the respective lens groups G1 to G4.

Although simplified in FIG. 1, the lens groups driver 3 may be driven by known arrangements such as one wherein helicoids located around the lens groups are rotated to move the lens groups, or an arrangement wherein a threaded hole is provided in a holder frame for holding the lens groups and a helical screw passing through it is rotated to move the lens groups forth and back.

In the example here, the first lens group G1, the second lens group G2, and the third lens group G3 is supposed to move along a guide groove in the helicoids by the rotation of the helicoids, and the fourth lens group G4 is supposed to be connected to the lens driver 3 capable of moving it separately from other lens groups.

The fourth lens group G4 moves separately in the axial direction for implementing focusing from a far distance to a nearby distance.

An image is formed by the zoom lens 1 on the imaging plane I of CCD 2. The imaging plane I is built up of multiple light receptors.

Figure 2:
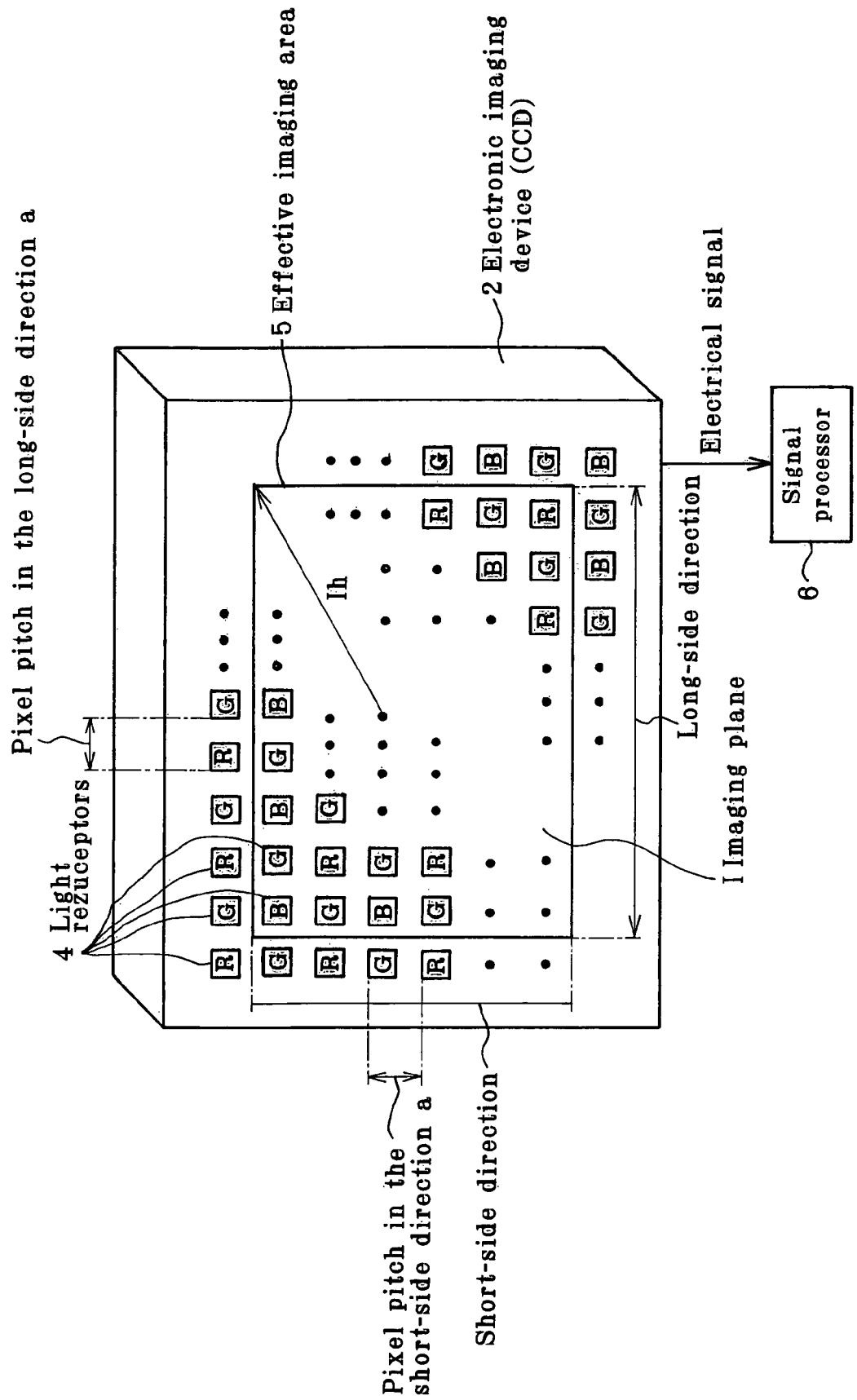
FIG. 2 is illustrative of one example of the pixel arrangement of an electronic imaging device.

A brief account is here given of an effective imaging area. FIG. 2 is illustrative of one example of the pixel arrangement of the electronic imaging device 2. Light receptors 4 corresponding to R (red), G (green) and B (blue) are arranged at a pixel pitch a or, alternatively, light receptors 4 corresponding to four colors cyan, magenta, yellow and green are arranged in a mosaic fashion.

The effective imaging area 5 refers to an area within the imaging plane I on the electronic imaging device 2 used for the reproduction of taken images (display output on a personal computer, print output by a printer, etc.). The effective imaging area 5 shown in FIG. 2 is set narrower than that having all light receptors of the imaging device 2 located in conformity with an image circle capable of making sure the performance of the zoom lens 1.

In FIG. 2, Ih refers to one-half the diagonal length of the effective imaging area 5 on the imaging plane I.

It is here noted that pseudo zooming may be implemented with a change in the imaging area, so that the imaging area used for image reproduction is variously changeable.

Although the effective imaging area 5 usually takes on a rectangular shape, image distortion due to the zoom lens 1 is often corrected by image processing. In such a case, the effective imaging area 5 is going to be approximate in shape to the image distortion due to the zoom lens 1. One possible approach is that image correction is electrically implemented while that shape is changed depending on the focal length state of the zoom lens 1.

Thus, when there is a change in the effective imaging area 5, Ih here is defined as the maximum of possible values.

An image taken by this electronic imaging device 2 (for instance, CCD or CMOS) is converted into electrical signals indicative of that image, and then guided to a signal processor 6.

At the signal processor 6, signal processing such as gamma-correction, contrast adjustment and image restoration is applied to the signals for the image taken by the imaging device 2 to generate image signals for the image to be restored.

At a contrast detector 7, changes in an image contrast due to the movement of the fourth lens group G4 are read out, and an image contrast within the focused area is detected so that the fourth lens group G4 is moved to a position identified to have a maximum contrast to generate signals for focusing operation.

Within the apparatus, a zooming-focusing instruction•storage unit 9 adapted to transmit drive signals to the lens groups driver 3 and hold information on zooming and focusing operations is electrically connected to a zooming•focusing operation unit 8 and the lens groups driver 3 so as to actuate zooming and focusing operations on the basis of signals from the zooming•focusing operation unit 8 that is located outside the apparatus and has a zooming manipulation lever, a focusing button, etc. on it.

The zooming•focusing instruction•storage unit 9 is also electrically connected to the signal processor 6 to receive focusing signals on the basis of detection of the image contrast at the contrast detector 7 in the signal processor 6 and provide instructions for the aforesaid focusing operation.

Within the apparatus, there is also an information holder 10 installed for holding a data table for the image restoration filter about the point spread function that differs depending on the focal length state and focusing state of the zoom lens 1.

In the example here, data conceptually assigned as set out in the following table are contained in the information holder 10.

|  | Focusing Distance a~b | Focal Length b~c |
|---|---|---|
| FL* A~B | Central Area B1 (u, v) | Central Area B9 (u, v) |
|  | Peripheral Area B2 (u, v) | Peripheral Area B10 (u, v) |
| FL* B~C | Central Area B3 (u, v) | Central Area B11 (u, v) |
|  | Peripheral Area B4 (u, v) | Peripheral Area B12 (u, v) |
| FL* C~D | Central Area B5 (u, v) | Central Area B13 (u, v) |
|  | Peripheral Area B6 (u, v) | Peripheral Area B14 (u, v) |
| FL* D~E | Central Area B7 (u, v) | Central Area B15 (u, v) |
|  | Peripheral Area B8 (u, v) | Peripheral Area B16 (u, v) |

FL*: focal length

Of course, the zooming state, the focusing state, and the image plane area may be more finely divided to hold data in place.

A better image restoration filter may also be found out by computation from the correlations of a plurality of held filters depending on focal length, focusing distance and onscreen position.

On the basis of information at the zooming•focusing instruction storage unit 9, the information holder 10 forwards the information of the image restoration filter depending on the corresponding focal length and focusing distance to the image restoration processor 11 of the signal processor 6.

Including the image restoration processor 11, the signal processor 6 uses data on the image taken by CCD 2 or image data subjected beforehand to gamma-correction or the like as the original data, so that deconvolution computation with the aforesaid restoration filter is used to implement image restoration processing.

The restoration filter used for image restoration is selected from those held at the information holder 10 based on information sent to the zooming•focusing instruction•storage unit 9, or alternatively generated through computation.

Image restoration is implemented for each imaging area on the imaging plane I, and image restoration processing is implemented using the corresponding restoration filter.

For image restoration processing, not only one deconvolution computation but also two or more computations are implemented.

Then, signal processing of making a splice between images restored per area is implemented for image synthesis, and processing such as brightness adjustment and color adjustment is applied to the thus restored image.

Optionally, image restoration processing may be implemented by computation with a Wiener filter or a common inverse filter, or by way of the maximum entropy method, the Tikhonov-miller method, the Rechardson-Lucy method, the Van Cittert method, the LLandweber method or the like, as already explained.

The restoration filter could also be generated while care is taken of information about image deterioration at the taking time.

The restoration filter could also be corrected while care is taken of exposure time, exposure dose, etc.

The imaging apparatus could also be provided with an acceleration sensor for implementing electrical correction processing for image deterioration due to shaking.

Image processing could also be implemented to correct image distortions for each of R, G and B by way of information based on the distortions and chromatic aberration of magnification of the zoom lens 1.

The image signals for the restored image are sent to a liquid crystal monitor 12 mounted on the back of the imaging apparatus so that they are displayed in a visible way.

The image data are also sent to a recording medium 13 that may be integral with or removed from the imaging apparatus so that the post-restoration image data can be recorded in it.

Some zoom lenses designed to be well fit for the imaging apparatus of such arrangement are now described.

Examples 1 to 5 of the zoom lens according to the invention are set out below. Lens arrangement sections of Examples 1 to 5 at the wide-angle end (a), in an intermediate state (b) and at the telephoto end (c), respectively, upon focusing on an object point at infinity are shown in FIGS. 3 to 7, wherein G1 stands for the first lens group, G2 the second lens group, S an aperture stop, G3 the third lens group, G4 the fourth lens group, F optical filters such as infrared cut filters and low-pass filters, CG a cover glass of CCD that is the electronic imaging device, and I the image plane of CCD. A near infrared sharp cut coating, for instance, may be applied directly to the optical low-pass filter F but there may be a separate infrared cut absorption filter provided as desired. Alternatively, a transparent flat plate having a near infrared sharp cut coating on its entrance surface may also be used.

EXAMPLE 1

Figure 3A:
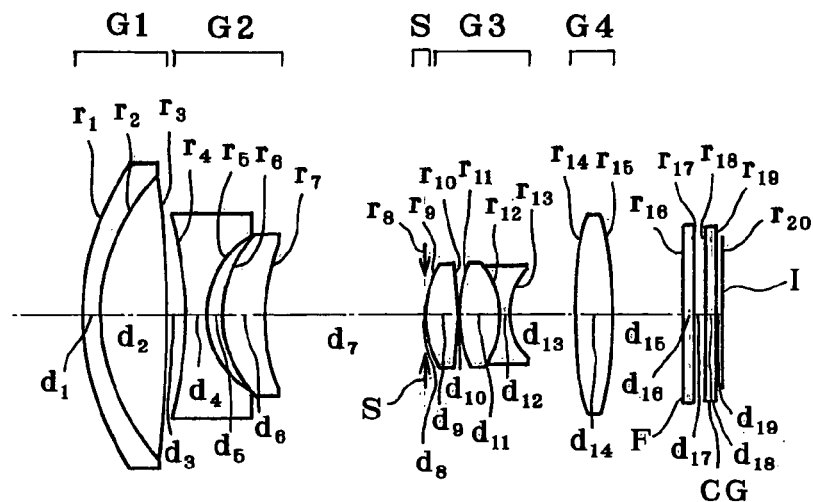
FIG. 3 is illustrative in lens arrangement section of the zoom lens according to Example 1 of the invention at a wide-angle end (a), in an intermediate state (b) and a telephoto end (c), upon focusing on an object point at infinity.
Figure 3B:
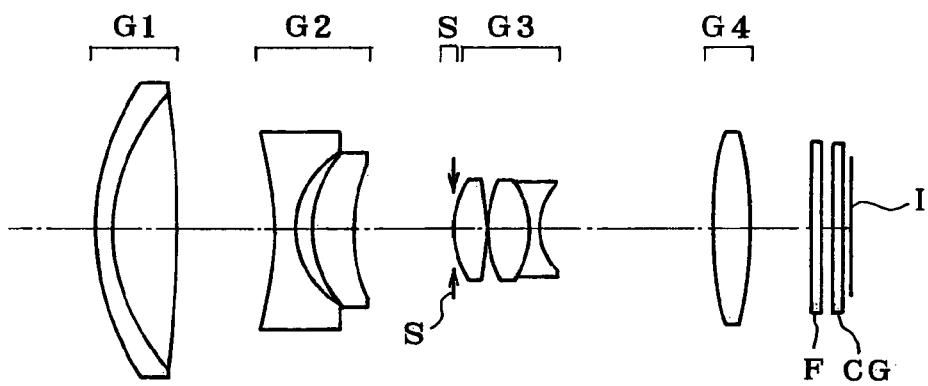
Figure 3C:
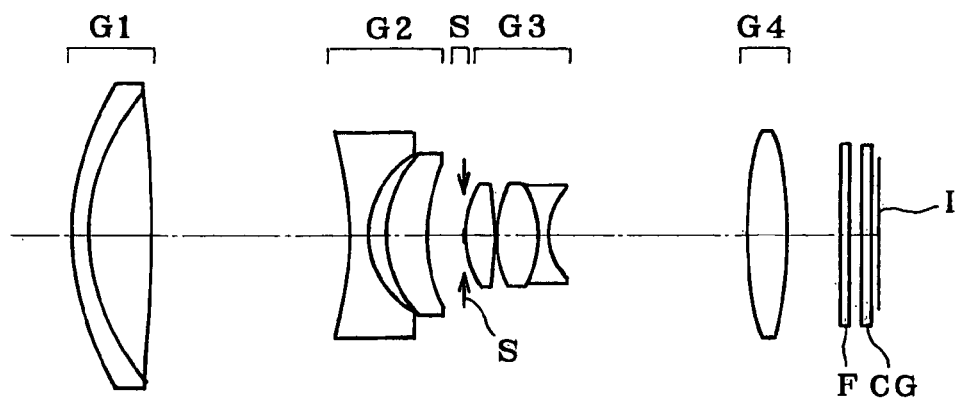

As shown in FIG. 3, the zoom lens of Example 1 is built up of, in order from its object side, a positive first lens group G1, a negative second lens group G2, an aperture stop S, a positive third lens group G3 and a positive fourth lens group G4. Upon zooming from the wide-angle end to the telephoto end, the first lens group G1 moves toward the object side; the second lens group G2 once moves toward the object side while the space between the first glens group G1 and it grows wide, then turns near an intermediate focal length back to the image side, and finally stays slightly more on the image side at the telephoto end than at the wide-angle end; the third lens group G3 moves toward the object side; and the fourth lens group G4 moves toward the image side. The aperture stop S moves in unison with the third lens group G3.

In order from the object side, the first lens group G1 is made up of a first negative meniscus lens convex on its object side and a double-convex second positive lens having an aspheric surface on its image side wherein the first lens and the second lens are cemented together; the second lens group G2 is made up of a double-concave third negative lens having aspheric surfaces on both sides and a fourth positive meniscus lens convex on its object side; the third lens group G3 is made up of a double-convex fifth positive lens having aspheric surfaces on both sides, a double-convex sixth positive lens and a double-concave seventh negative lens wherein the sixth lens and the seventh lens are cemented together; and the fourth lens group G4 is made up of a double-convex eighth positive lens having an aspheric surface on the object side.

The specifications of the example here are an image height of 3.84 mm, a focal length of 6.53 to 14.29 to 31.35 mm, and an F-number of 3.45 to 4.75 to 5.05.

EXAMPLE 2

Figure 4A:
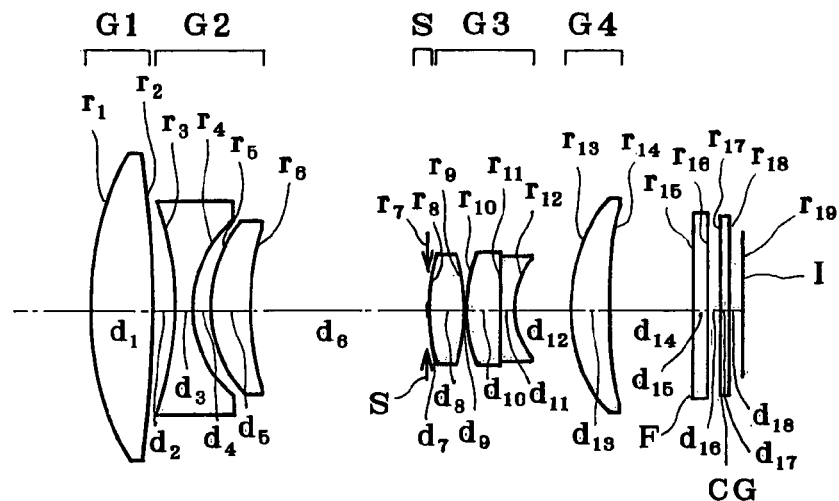
FIG. 4 is illustrative in lens arrangement section, as in FIG. 2, of the zoom lens according to Example 2 of the invention.
Figure 4B:
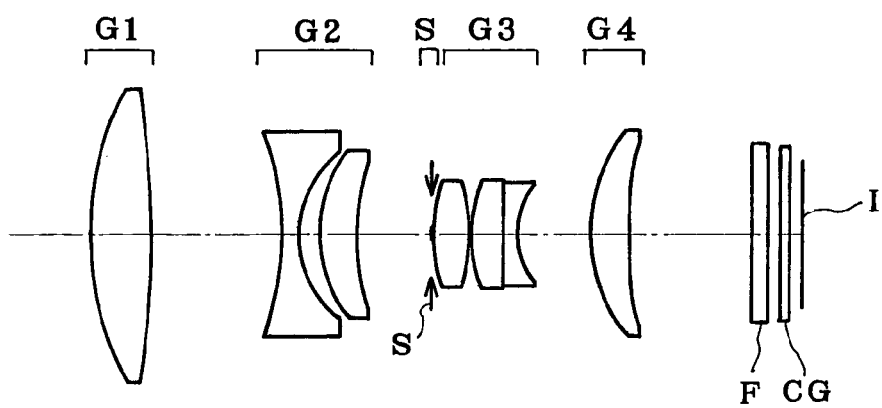
Figure 4C:
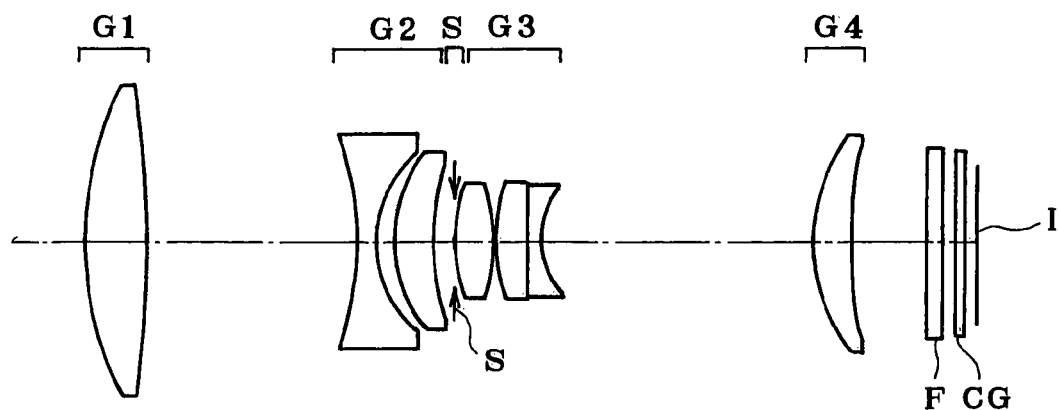

As shown in FIG. 4, the zoom lens of Example 2 is built up of, in order from its object side, a positive first lens group G1, a negative second lens group G2, an aperture stop S, a positive third lens group G3 and a positive fourth lens group G4. Upon zooming from the wide-angle end to the telephoto end, the first lens group G1 moves toward the object side; the second lens group G2 once moves toward the image side, then turns near an intermediate focal length back to the object side, and finally stays more on the object side at the telephoto end than at the wide-angle end; the third lens group G3 moves toward the object side while the space between the second lens group G2 and 1 becomes narrow; and the fourth lens group G4 once moves toward the object side while the space between the third lens group G3 and it grows wide, then turns near an intermediate focal length back toward the image side, and finally stays more on the image side at the telephoto end than at the wide-angle end. The aperture stop S moves in unison with the third lens group G3.

In order from the object side, the first lens group G1 is made up of a double-convex first positive lens having aspheric surfaces on both sides; the second lens group G2 is made up of a double-concave second negative lens having aspheric surfaces on both sides and a third positive meniscus lens convex on its object side; the third lens group G3 is made up of a double-convex fourth positive lens having aspheric surfaces on both sides, a fifth positive lens convex on its object side and a sixth negative meniscus lens convex on its object side wherein the fifth lens and the sixth lens are cemented together, and the fourth lens group G4 is made up of a seventh positive meniscus lens that has an aspheric surface on its object side and is convex on its object side.

The specifications of the example here are an image height of 3.84 mm, a focal length of 6.55 to 14.29 to 31.34 mm, and an F-number of 3.25 to 3.82 to 5.05.

EXAMPLE 3

Figure 5A:
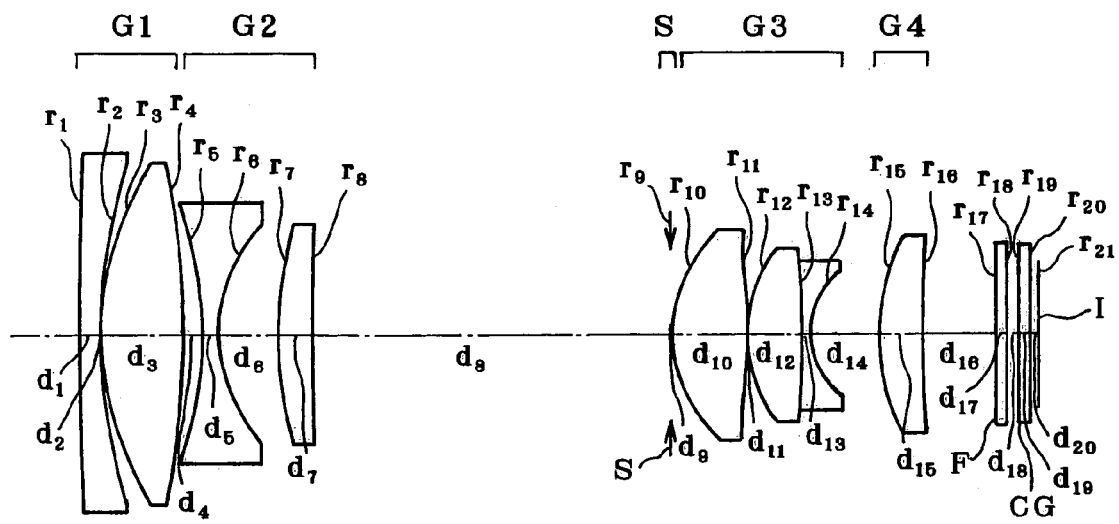
FIG. 5 is illustrative in lens arrangement section, as in FIG. 3, of the zoom lens according to Example 2 of the invention.
Figure 5B:
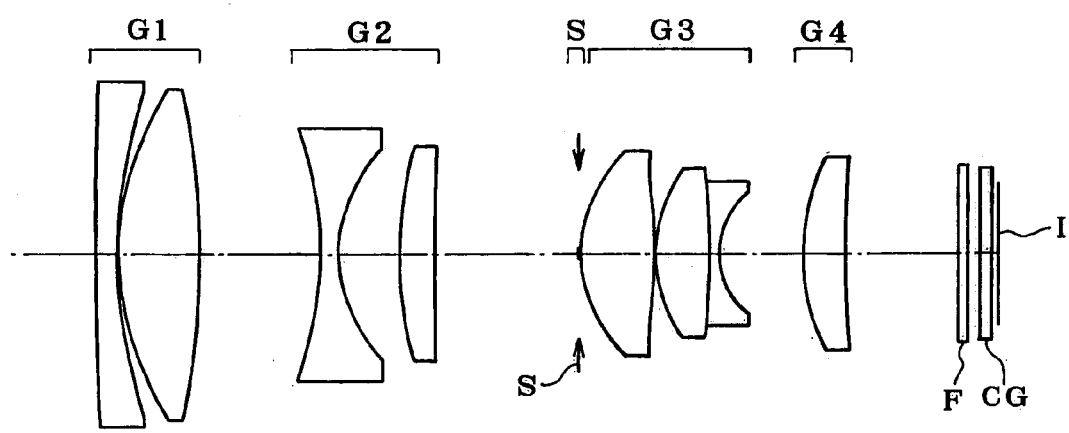
Figure 5C:
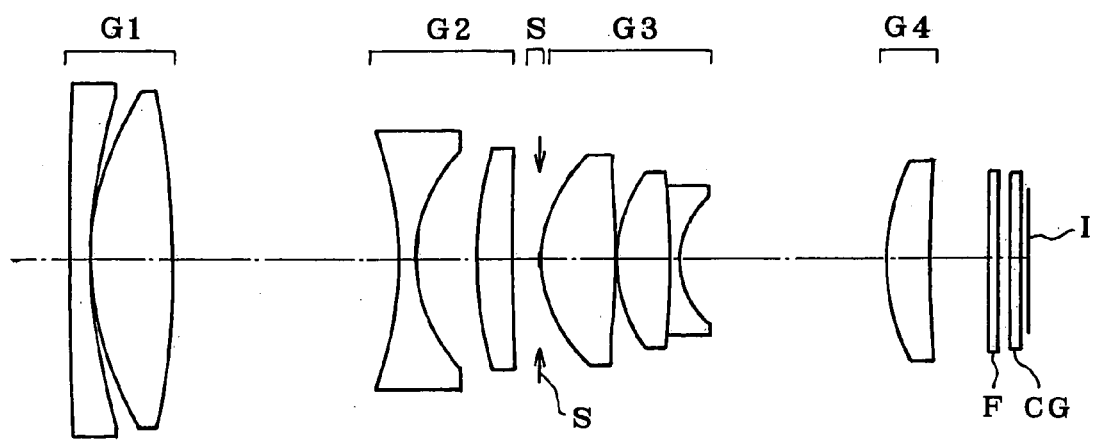

As shown in FIG. 5, the zoom lens of Example 2 is built up of, in order from its object side, a positive first lens group G1, a negative second lens group G2, an aperture stop S, a positive third lens group G3 and a positive fourth lens group G4. Upon zooming from the wide-angle end to the telephoto end, the first lens group G1 once moves toward the image side, then turns near an intermediate focal length back to the object side, and finally stays slightly more on the object side at the telephoto end than at the wide-angle end; the second lens group G2 moves toward the image side while the space between the first lens group G1 and it grows wide; the third lens group G3 moves toward the object side; and the fourth lens group G4 once toward the object side while the space between the third lens group G3 and it grows wide, then turns near an intermediate focal length back to the image side, and finally stays more on the image side at the telephoto end than at the wide-angle end. The aperture stop S moves in unison with the third lens group G3.

In order from the object side, the first lens group G1 is made up of a first negative meniscus lens convex on its object side and a double-convex second positive lens having aspheric surfaces on both sides; the second lens group G2 is made up of a double-concave third negative lens having aspheric surfaces on both sides and a fourth positive meniscus lens convex on its object side; the third lens group G3 is made up of a double-convex fifth positive lens having aspheric surfaces on both sides, a double-convex sixth positive lens having an aspheric surface on its object side and a double-concave seventh negative lens wherein the sixth lens and the seventh lens are cemented together; and the fourth lens group G4 is made up of an eighth positive meniscus lens that has an aspheric surface on its object side and is convex on its object side.

The specifications of the example here are an image height of 3.84 mm, a focal length of 6.53 to 14.30 to 31.35 mm, and an F-number of 1.84 to 2.16 to 2.54.

EXAMPLE 4

Figure 6A:
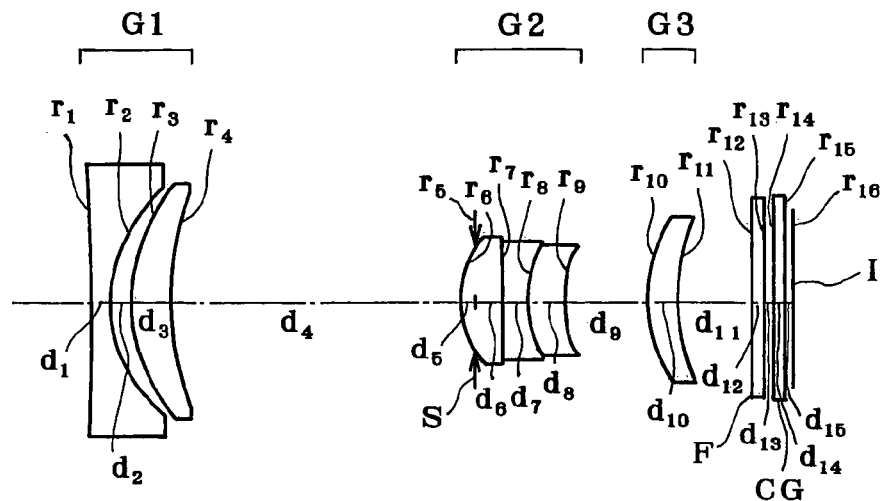
FIG. 6 is illustrative in lens arrangement section, as in FIG. 4, of the zoom lens according to Example 2 of the invention.
Figure 6B:
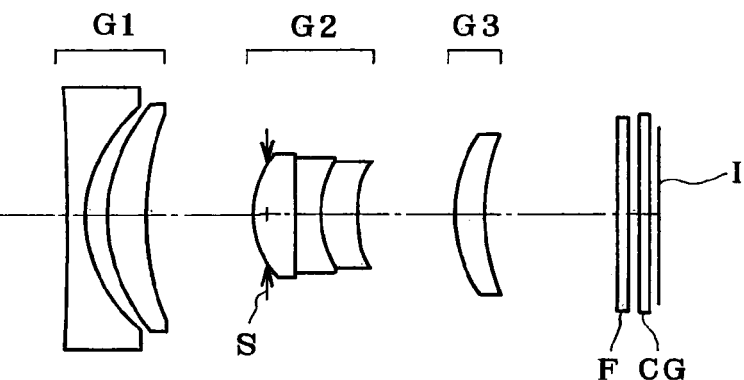
Figure 6C:
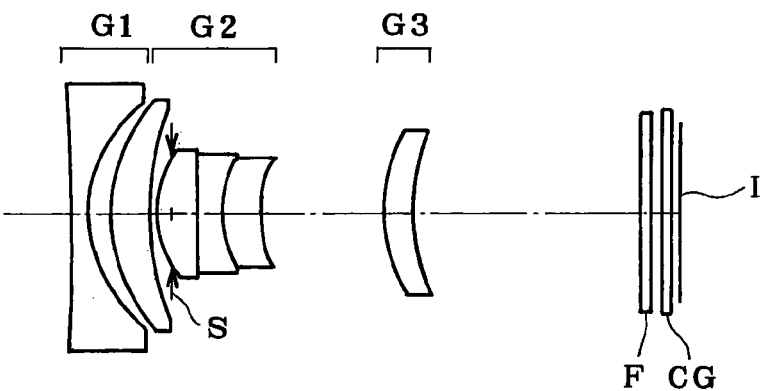

As shown in FIG. 6, the zoom lens of Example 4 is built up of, in order from its object side, a negative first lens group G1, an aperture stop S, a positive second lens group G2 and a positive third lens group G3. Upon zooming from the wide-angle end to the telephoto end, the first lens group G1 once moves toward the image side, then turns near an intermediate focal length back to the object side, and finally stays more on the image side at the telephoto end than at the wide-angle end; the second lens group G2 moves toward the object side while the space between the first lens group G1 and it becomes narrow; and the third lens group G3 moves toward the object side while the space between the second lens group G2 and it grows wide.

In order from the object side, the first lens group G1 is made up of a double-concave first negative lens having an aspheric surface on its image side and a second positive meniscus lens convex on its object side; the second lens group G2 is made up of a third positive meniscus lens that has an aspheric surface on its object side and is convex on its object side, a fourth negative meniscus lens convex on its object side and a fifth positive meniscus lens that has an aspheric surface on its image side and is convex on its object side wherein the third, the fourth and the fifth lens are cemented together, and the third lens group G3 is made up of a sixth positive meniscus lens that has an aspheric surface on its object side and is convex on its object side.

In the example here, the aperture stop S is positioned more on the image side that at the apex of the convex surface located in, and nearest to the object side of, the third lens group, and the convex surface located in, and nearest to the object side of, the third lens group G3 makes its way partly into the aperture in the aperture stop S so that the aperture stop S moves in unison with the third lens group G3.

The specifications of the example here are an image height of 4.55 mm, a focal length of 7.53 to 13.03 to 21.64 mm, and an F-number of 2.88 to 3.65 to 4.85.

EXAMPLE 5

Figure 7A:
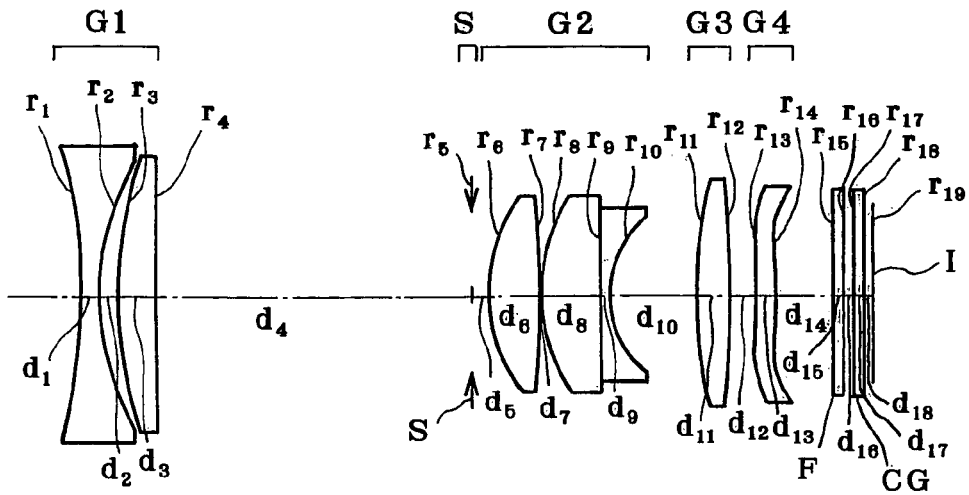
FIG. 7 is illustrative in lens arrangement section, as in FIG. 5, of the zoom lens according to Example 2 of the invention.
Figure 7B:
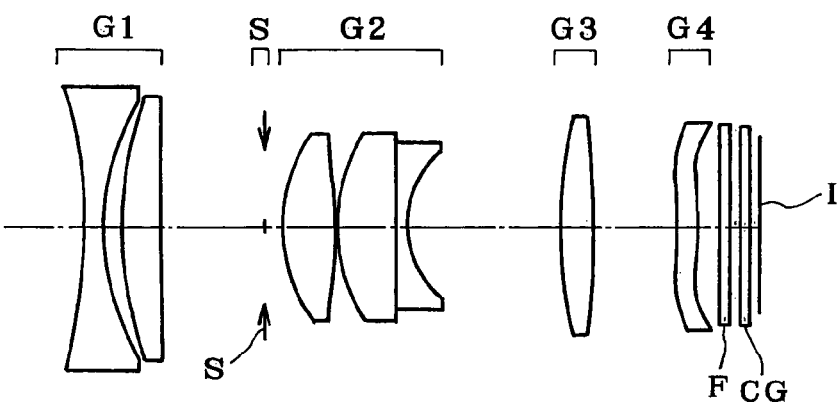
Figure 7C:
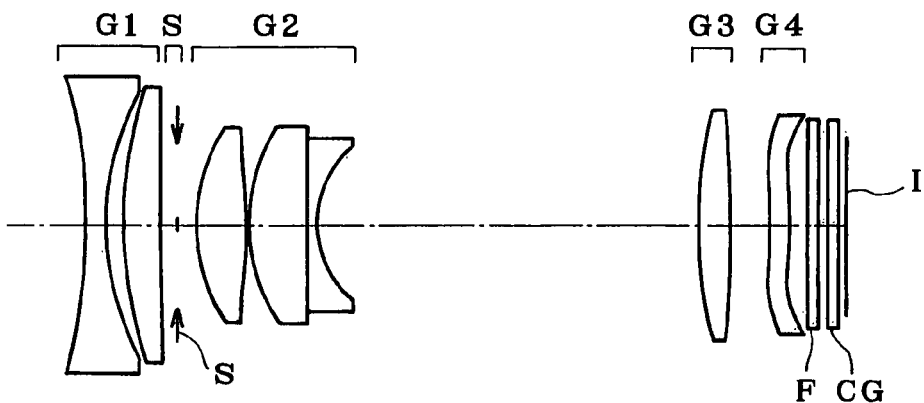
Figure 8A:
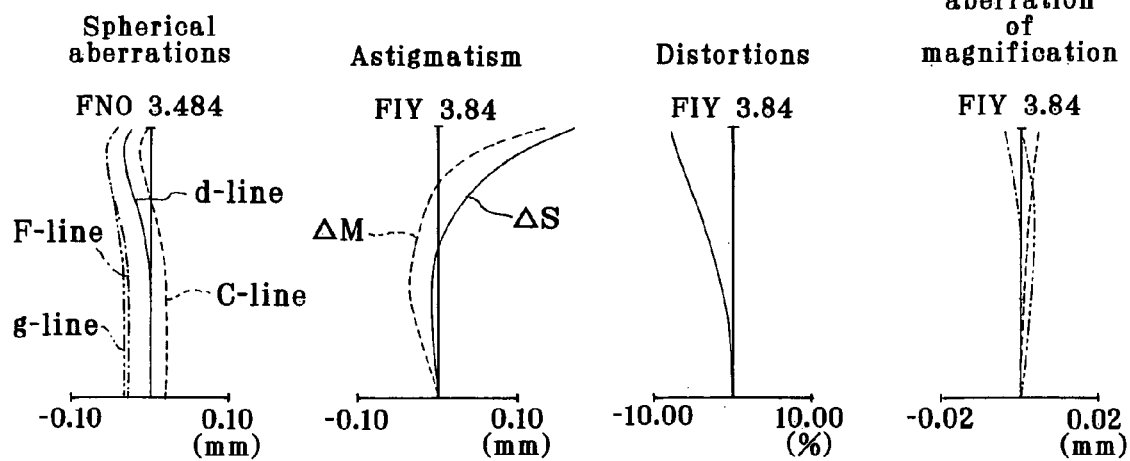
FIG. 8 is an aberration diagram form the zoom lens according to Example 1 upon focusing on an object point at infinity.
Figure 8B:
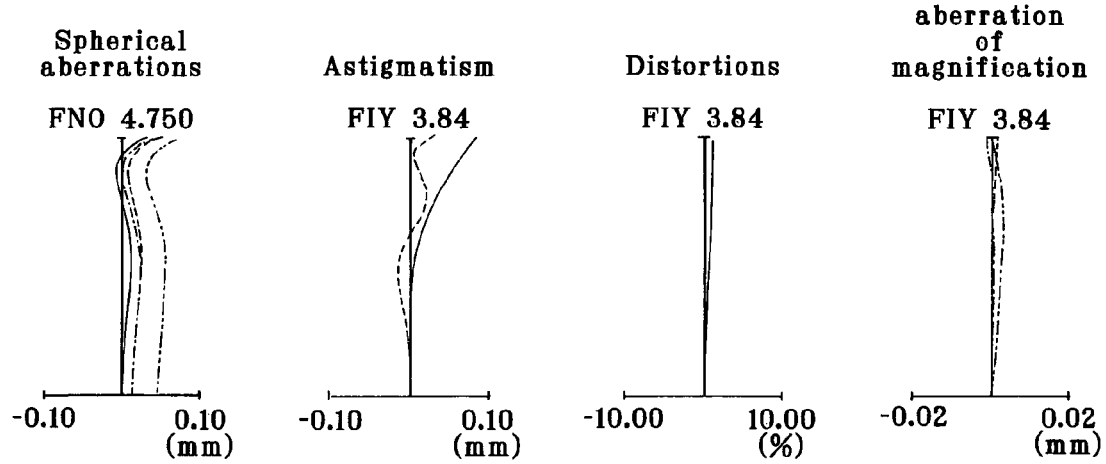
Figure 8C:
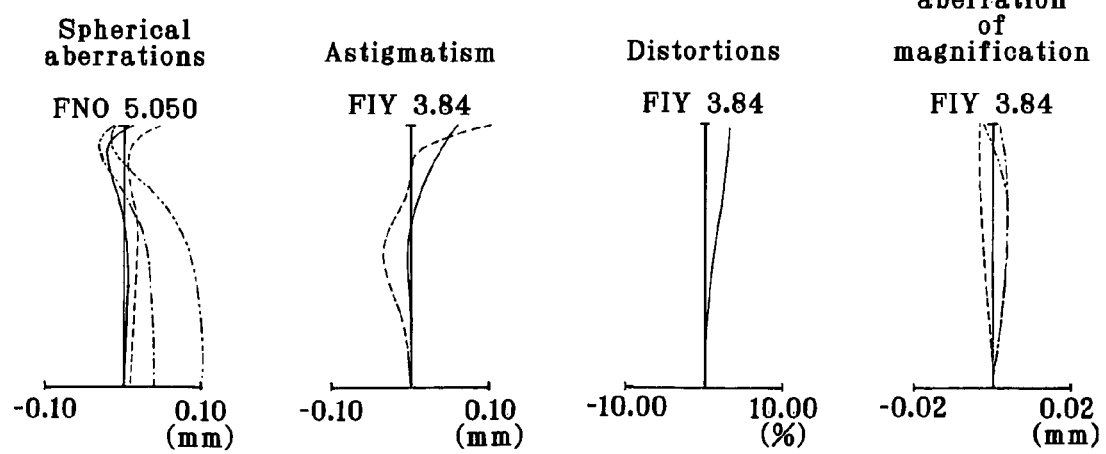
Figure 9A:
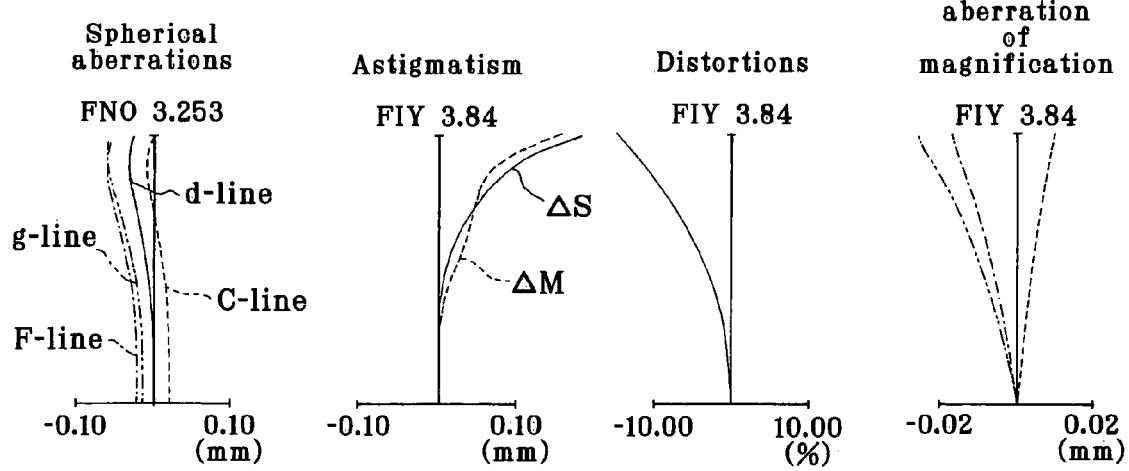
FIG. 9 is an aberration diagram form the zoom lens according to Example 2 upon focusing on an object point at infinity.
Figure 9B:
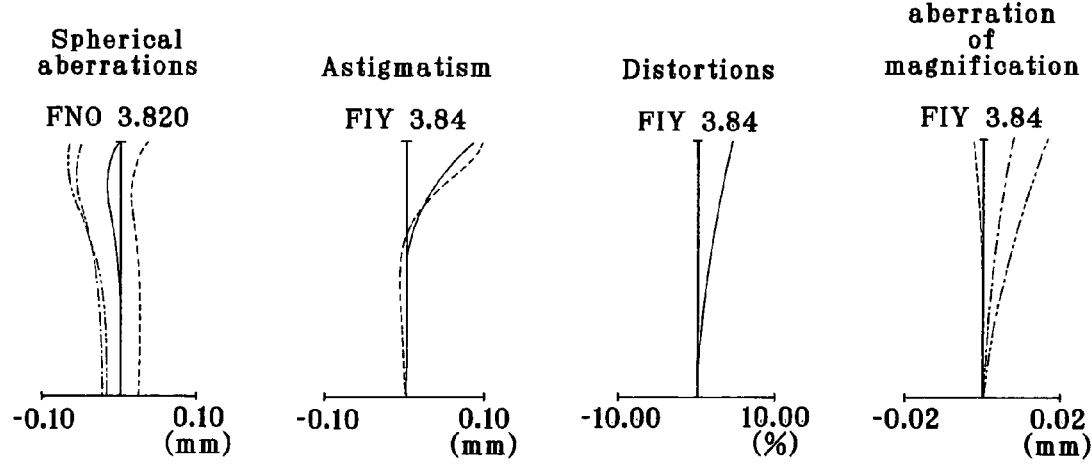
Figure 9C:
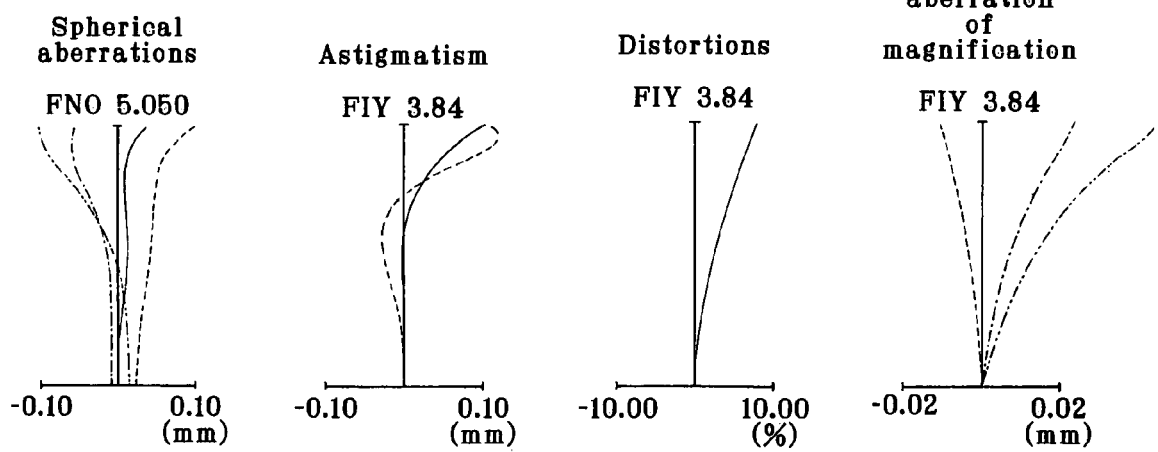
Figure 10A:
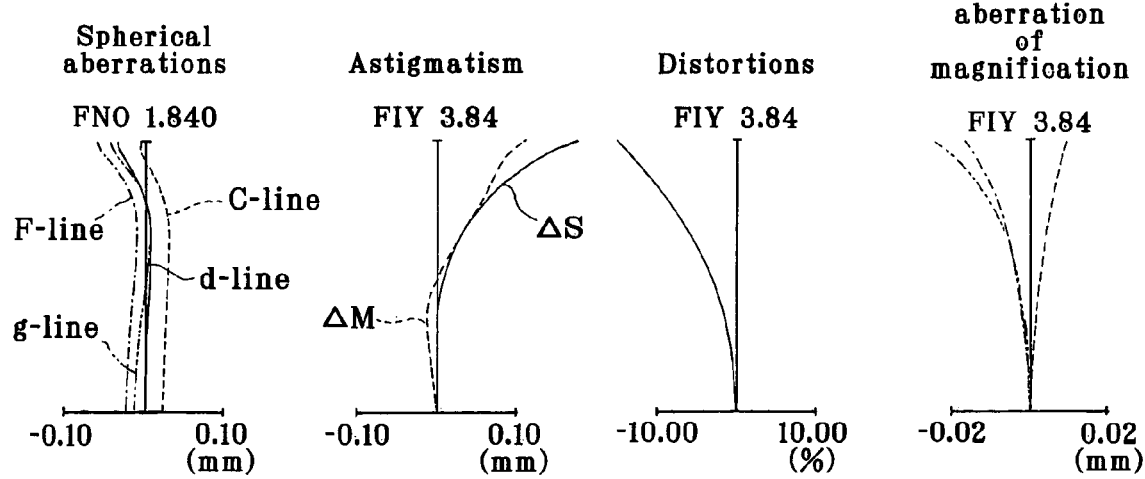
FIG. 10 is an aberration diagram form the zoom lens according to Example 3 upon focusing on an object point at infinity.
Figure 10B:
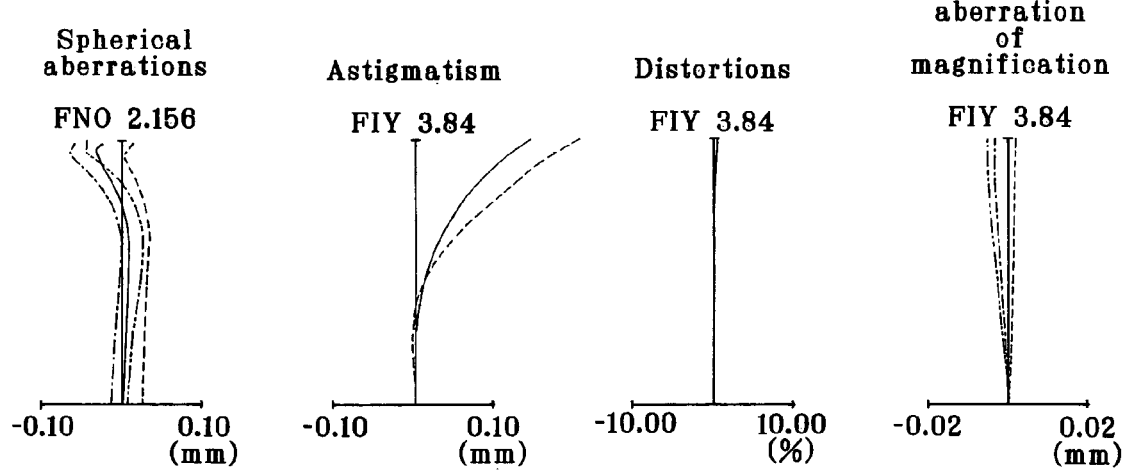
Figure 10C:
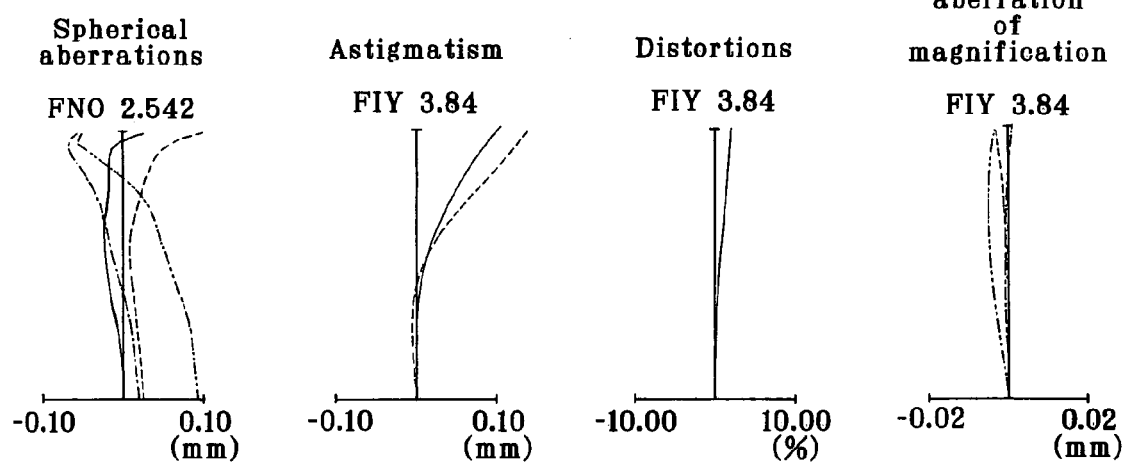
Figure 11A:
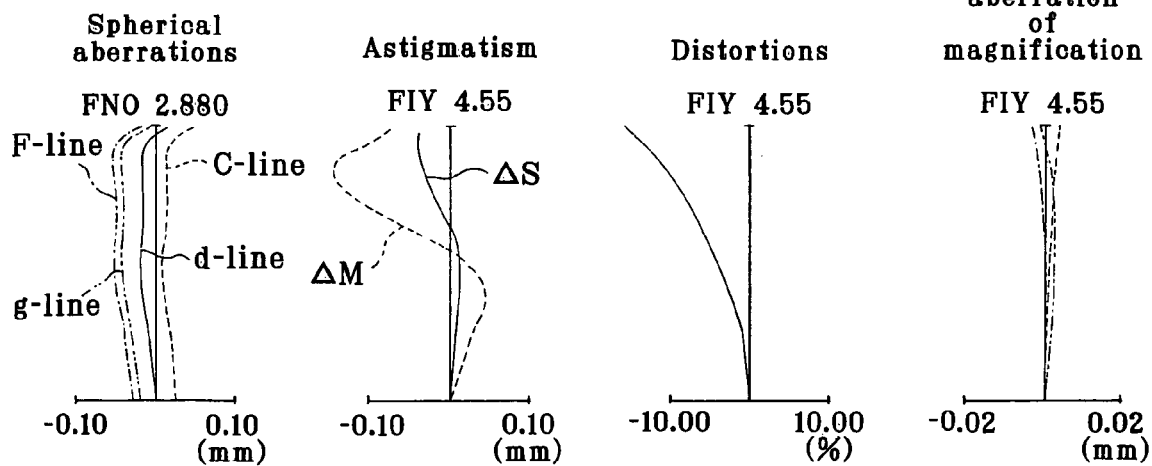
FIG. 11 is an aberration diagram form the zoom lens according to Example 4 upon focusing on an object point at infinity.
Figure 11B:
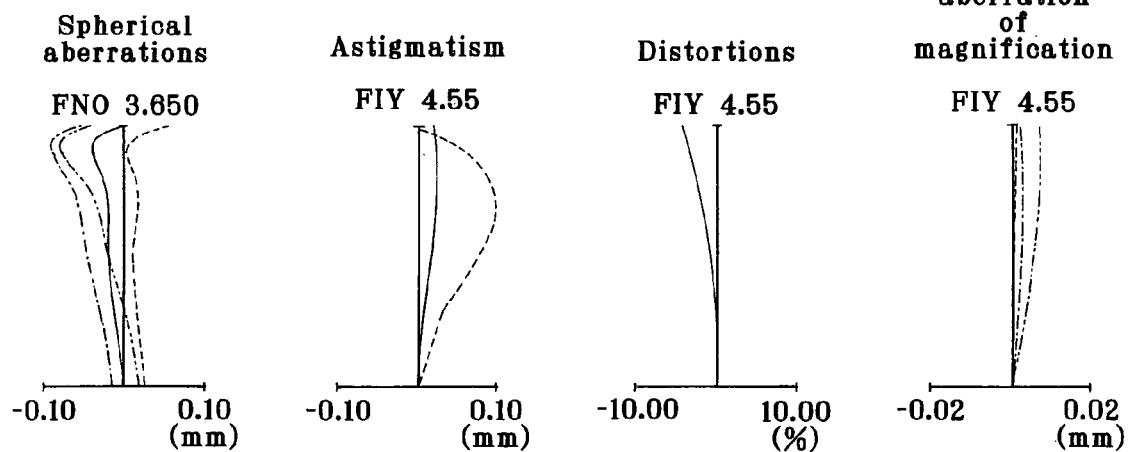
Figure 11C:
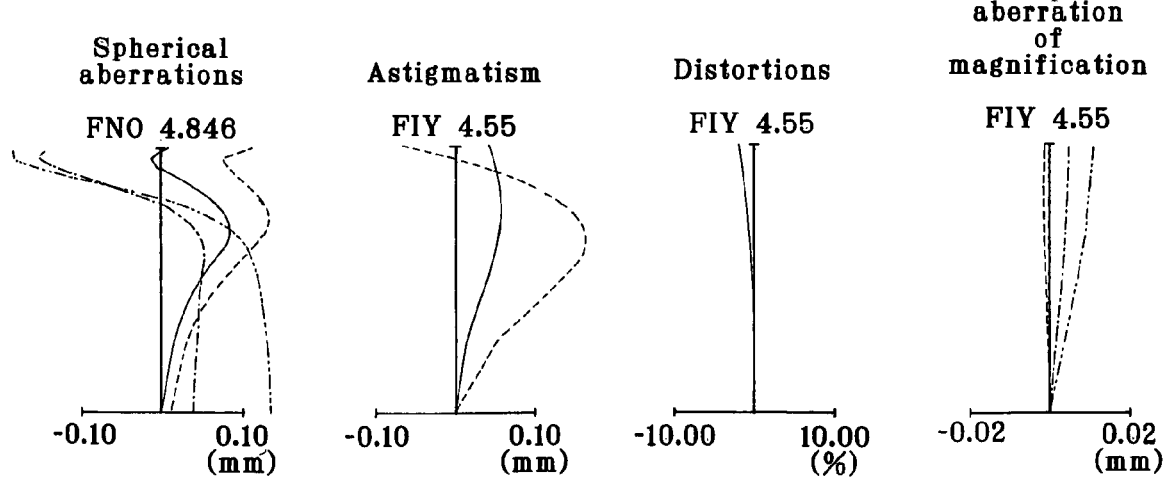
Figure 12A:
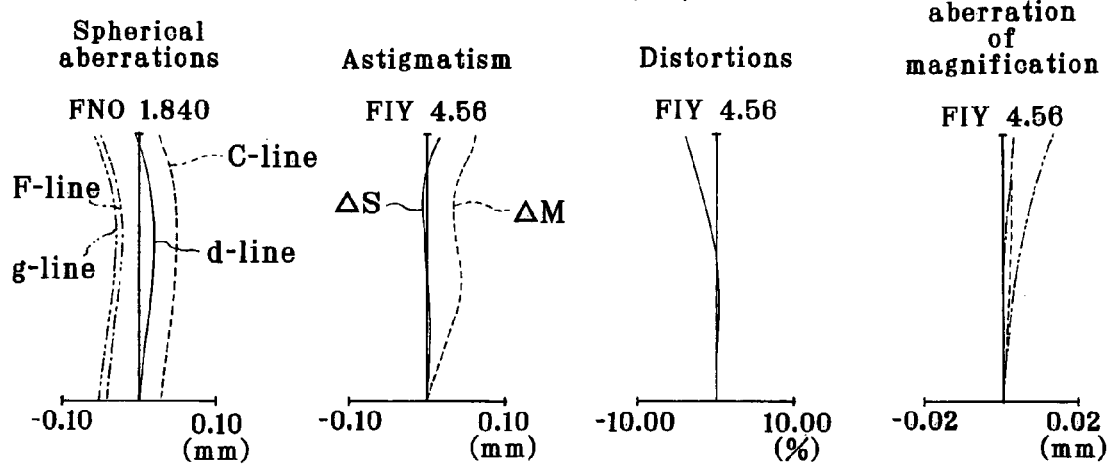
FIG. 12 is an aberration diagram form the zoom lens according to Example 5 upon focusing on an object point at infinity.
Figure 12B:
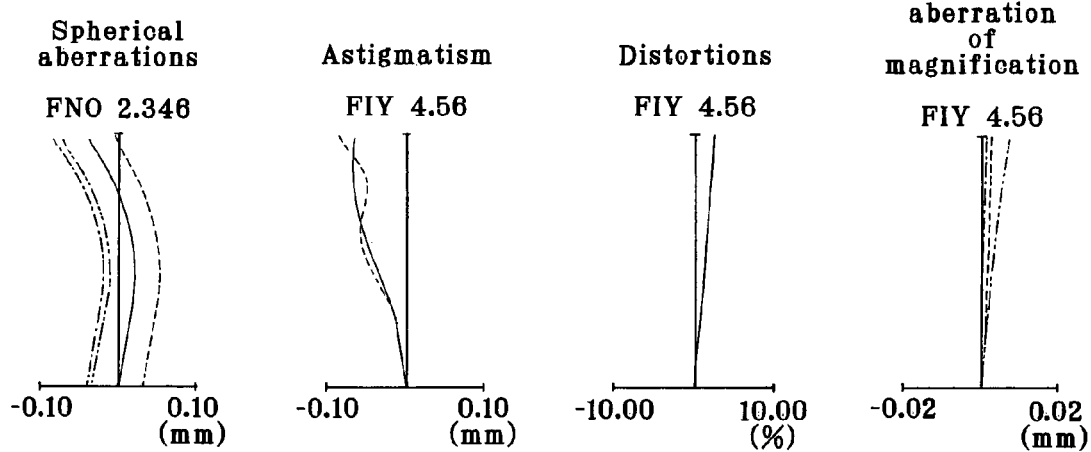
Figure 12C:
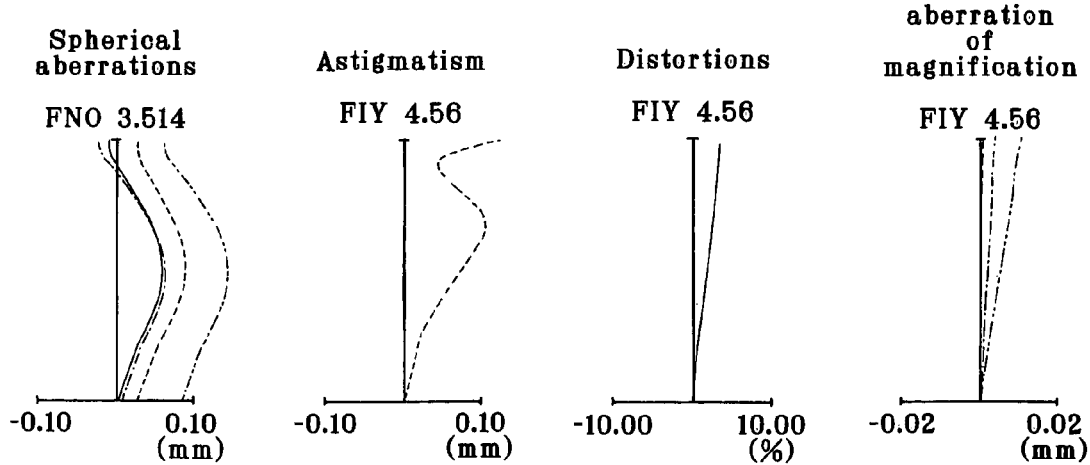

As shown in FIG. 7, the zoom lens of Example 5 is built up of, in order from its object side, a negative first lens group G1, an aperture stop S, a positive second lens group G2, a positive third lens group G3 and a positive fourth lens group G4. Upon zooming from the wide-angle end to the telephoto end, the first lens group G1 once moves toward the image side, then turns near an intermediate focal length back to the object side, and finally stays more on the image side at the telephoto end than at the wide-angle end; the second lens group G2 moves toward the object side while the space between the first lens group G1 and it becomes narrow; the third lens group G3 once moves toward the object side while the space between the second lens group G2 and it grows wide, then turns near an intermediate focal length back to the image side, and finally stays more on the image side at the telephoto end than at the wide-angle end; and the fourth lens group G4 toward the image side while the space between the third lens group G3 and it first grows wide and then becomes narrow. The aperture stop S moves in unison with the third lens group G3.

In order from the object side, the first lens group G1 is made up of a double-concave first negative lens having aspheric surfaces on both sides and a second positive lens convex on its object side; the second lens group G2 is made up of a double-convex third positive lens having aspheric surfaces on both sides, a double-convex fourth positive lens and a double-concave fifth negative lens wherein the fourth lens and the fifth lens are cemented together; the third lens group G3 is made up of a double-convex sixth positive lens having an aspheric surface on its image side; and the fourth lens group G4 is made up of a seventh positive lens that has aspheric surfaces on both sides and is convex on its image side.

The specifications of the example here are an image height of 4.56 mm, a focal length of 8.04 to 13.59 to 23.24 mm, and an F-number of 1.84 to 2.35 to 3.51.

Numerical data on each example are set out below. Symbols used hereinafter but not hereinbefore have the following meanings:

f: the focal length of the whole system, $F_{NO}$: F-number, $2\omega$: an angle of view, WE: the wide-angle end, ST: an intermediate state, TE: the telephoto end, $r_1, r_2, \ldots$: the radius of curvature of each lens surface, $d_1, d_2, \ldots$: the space between the respective lens surfaces, and $\nu_{d1}, \nu_{d2}, \ldots$: the Abbe number of each lens. Here x be an optical axis provided that the direction of propagation of light is taken as positive, and y be a direction orthogonal to the optical axis. Then, aspheric surface shape is given by $$x=(y^2/r)/[1+\{1-(K+1)(y/r)^2\}^{1/2}]+A_4y^4+A_6y^6+A_8y^8+A_{10}y^{10}+A_{12}y^{12}+A_{14}y^{14}+A_{16}y^{16}$$

where r is a paraxial radius of curvature, K is a conical coefficient, and $A_4, A_6, A_8, A_{10}, A_{12}, A_{14}$, and $A_{16}$ are the $4^{th}$, $6^{th}$, $8^{th}$, $10^{th}$, $12^{th}$, $14^{th}$, and $16^{th}$ aspheric coefficient, respectively.

EXAMPLE 1

| | | | |
|---|---|---|---|
| $r_1 = 13.941$ | $d_1 = 0.80$ | $n_{d1} = 1.92286$ | $\nu_{d1} = 20.88$ |
| $r_2 = 10.260$ | $d_2 = 3.33$ | $n_{d2} = 1.58233$ | $\nu_{d2} = 59.40$ |
| $r_3 = -45.370$ (Aspheric) | $d_3 = $ (Variable) | | |
| $r_4 = -13.175$ (Aspheric) | $d_4 = 0.90$ | $n_{d3} = 1.83481$ | $\nu_{d3} = 42.71$ |
| $r_5 = 4.180$ (Aspheric) | $d_5 = 0.80$ | | |
| $r_6 = 5.674$ | $d_6 = 2.07$ | $n_{d4} = 1.94595$ | $\nu_{d4} = 17.98$ |
| $r_7 = 9.459$ | $d_7 = $ (Variable) | | |
| $r_8 = \infty$ (Stop) | $d_8 = 0.00$ | | |
| $r_9 = 4.390$ (Aspheric) | $d_9 = 1.60$ | $n_{d5} = 1.51573$ | $\nu_{d5} = 64.10$ |
| $r_{10} = -10.248$ (Aspheric) | $d_{10} = 0.10$ | | |
| $r_{11} = 7.016$ | $d_{11} = 2.00$ | $n_{d6} = 1.77250$ | $\nu_{d6} = 49.60$ |
| $r_{12} = -4.424$ | $d_{12} = 0.40$ | $n_{d7} = 1.74950$ | $\nu_{d7} = 35.28$ |
| $r_{13} = 3.071$ | $d_{13} = $ (Variable) | | |
| $r_{14} = 27.505$ (Aspheric) | $d_{14} = 1.87$ | $n_{d8} = 1.74330$ | $\nu_{d8} = 49.33$ |
| $r_{15} = -21.289$ | $d_{15} = $ (Variable) | | |
| $r_{16} = \infty$ | $d_{16} = 0.50$ | $n_{d9} = 1.51633$ | $\nu_{d9} = 64.14$ |
| $r_{17} = \infty$ | $d_{17} = 0.50$ | | |
| $r_{18} = \infty$ | $d_{18} = 0.50$ | $n_{d10} = 1.51633$ | $\nu_{d10} = 64.14$ |
| $r_{19} = \infty$ | $d_{19} = 0.36$ | | |
| $r_{20} = \infty$ (Imaging plane) | | | |

| Aspherical Coefficients |
|---|
| 3rd surface |
| $K = 0.000$ |
| $A_4 = 4.12725 \times 10^{-5}$ |
| $A_6 = 6.93194 \times 10^{-8}$ |
| $A_8 = -5.03992 \times 10^{-9}$ |
| $A_{10} = 4.54452 \times 10^{-11}$ |
| 4th surface |
| $K = 0.232$ |
| $A_4 = 3.06592 \times 10^{-4}$ |
| $A_6 = 2.98441 \times 10^{-5}$ |
| $A_8 = -1.52860 \times 10^{-6}$ |
| $A_{10} = 2.61101 \times 10^{-8}$ |
| 5th surface |
| $K = -0.394$ |
| $A_4 = -3.82320 \times 10^{-4}$ |
| $A_6 = 7.70476 \times 10^{-5}$ |
| $A_8 = -2.22263 \times 10^{-6}$ |
| $A_{10} = 6.93214 \times 10^{-8}$ |
| 9th surface |
| $K = -0.234$ |
| $A_4 = -9.41013 \times 10^{-4}$ |
| $A_6 = 4.11176 \times 10^{-5}$ |
| $A_8 = 4.33798 \times 10^{-6}$ |
| $A_{10} = 1.94113 \times 10^{-6}$ |
| 10th surface |
| $K = 0.000$ |
| $A_4 = 1.53267 \times 10^{-3}$ |
| $A_6 = 3.70795 \times 10^{-5}$ |
| $A_8 = 2.25354 \times 10^{-6}$ |
| $A_{10} = 4.16624 \times 10^{-6}$ |
| 14th surface |
| $K = -187.333$ |
| $A_4 = 1.10703 \times 10^{-3}$ |
| $A_6 = -7.60484 \times 10^{-5}$ |
| $A_8 = 4.34536 \times 10^{-6}$ |
| $A_{10} = -8.93179 \times 10^{-8}$ |
| $A_{12} = 1.75310 \times 10^{-11}$ |

-continued $A_{14} = -1.64580 \times 10^{-10}$
$A_{16} = 7.61748 \times 10^{-12}$ Zooming Data (∞)

|  | WE | ST | TE |
|---|---|---|---|
| f (mm) | 6.53 | 14.29 | 31.35 |
| $F_{NO}$ | 3.48 | 4.75 | 5.05 |
| 2ω (°) | 65.09 | 29.75 | 13.53 |
| $d_3$ | 0.83 | 4.62 | 9.44 |
| $d_7$ | 7.76 | 4.82 | 1.68 |
| $d_{13}$ | 3.33 | 8.67 | 9.94 |
| $d_{15}$ | 3.57 | 3.05 | 2.74 |

EXAMPLE 2

| | | | |
|---|---|---|---|
| $r_1 = 17.576$ (Aspheric) | $d_1 = 3.10$ | $n_{d1} = 1.49700$ | $\nu_{d1} = 81.54$ |
| $r_2 = -34.901$ (Aspheric) | $d_2 =$ (Variable) | | |
| $r_3 = -12.242$ (Aspheric) | $d_3 = 0.80$ | $n_{d2} = 1.80610$ | $\nu_{d2} = 40.92$ |
| $r_4 = 5.092$ (Aspheric) | $d_4 = 1.00$ | | |
| $r_5 = 7.035$ | $d_5 = 1.76$ | $n_{d3} = 1.92286$ | $\nu_{d3} = 20.88$ |
| $r_6 = 13.136$ | $d_6 =$ (Variable) | | |
| $r_7 = \infty$ (Stop) | $d_7 = 0.06$ | | |
| $r_8 = 7.206$ (Aspheric) | $d_8 = 1.80$ | $n_{d4} = 1.77250$ | $\nu_{d4} = 49.60$ |
| $r_9 = -16.361$ (Aspheric) | $d_9 = 0.10$ | | |
| $r_{10} = 7.946$ | $d_{10} = 1.60$ | $n_{d5} = 1.72916$ | $\nu_{d5} = 54.68$ |
| $r_{11} = 72.753$ | $d_{11} = 0.70$ | $n_{d6} = 1.84666$ | $\nu_{d6} = 23.78$ |
| $r_{12} = 3.957$ | $d_{12} =$ (Variable) | | |
| $r_{13} = 9.054$ (Aspheric) | $d_{13} = 1.80$ | $n_{d7} = 1.69895$ | $\nu_{d7} = 30.13$ |
| $r_{14} = 60.902$ (Aspheric) | $d_{14} =$ (Variable) | | |
| $r_{15} = \infty$ | $d_{15} = 0.81$ | $n_{d8} = 1.54771$ | $\nu_{d8} = 62.84$ |
| $r_{16} = \infty$ | $d_{16} = 0.57$ | | |
| $r_{17} = \infty$ | $d_{17} = 0.47$ | $n_{d9} = 1.51633$ | $\nu_{d9} = 64.14$ |
| $r_{18} = \infty$ | $d_{18} = 0.59$ | | |
| $r_{19} = \infty$ (Imaging plane) | | | |

Aspherical Coefficients

1st surface $K = 0.000$
$A_4 = 5.04557 \times 10^{-5}$
$A_6 = 4.78766 \times 10^{-8}$
$A_8 = -3.29005 \times 10^{-9}$
$A_{10} = 7.61743 \times 10^{-11}$ 2nd surface $K = 0.000$
$A_4 = 1.02541 \times 10^{-4}$
$A_6 = -6.32316 \times 10^{-7}$
$A_8 = 4.94778 \times 10^{-9}$
$A_{10} = -4.47738 \times 10^{-12}$ 3rd surface $K = 0.000$
$A_4 = 4.38031 \times 10^{-4}$
$A_6 = 6.87497 \times 10^{-6}$
$A_8 = -5.54821 \times 10^{-7}$
$A_{10} = 1.06885 \times 10^{-8}$ 4th surface $K = 0.000$
$A_4 = -2.46251 \times 10^{-4}$
$A_6 = 1.68652 \times 10^{-5}$
$A_8 = -1.46504 \times 10^{-6}$
$A_{10} = -2.60311 \times 10^{-9}$ 8th surface $K = 0.519$
$A_4 = -1.40739 \times 10^{-3}$
$A_6 = -5.08831 \times 10^{-5}$
$A_8 = -9.03189 \times 10^{-7}$
$A_{10} = -1.12315 \times 10^{-6}$ 9th surface $K = 0.000$
$A_4 = -7.27152 \times 10^{-4}$
$A_6 = -4.73951 \times 10^{-5}$
$A_8 = -7.52743 \times 10^{-7}$
$A_{10} = -8.73382 \times 10^{-7}$ 13th surface $K = 0.000$
$A_4 = 5.21208 \times 10^{-4}$
$A_6 = -8.23673 \times 10^{-6}$
$A_8 = 0$
$A_{10} = 0$ 14th surface $K = 0.000$
$A_4 = 1.01251 \times 10^{-3}$
$A_6 = -1.72933 \times 10^{-5}$
$A_8 = 8.01285 \times 10^{-8}$
$A_{10} = -3.51319 \times 10^{-9}$ Zooming Data (∞)

|  | WE | ST | TE |
|---|---|---|---|
| f (mm) | 6.55 | 14.29 | 31.34 |
| $F_{NO}$ | 3.25 | 3.82 | 5.05 |
| 2ω (°) | 69.11 | 28.86 | 12.93 |
| $d_2$ | 0.98 | 6.17 | 10.16 |
| $d_6$ | 8.50 | 3.55 | 1.00 |
| $d_{12}$ | 2.77 | 3.54 | 13.19 |
| $d_{14}$ | 4.14 | 6.03 | 3.69 |

EXAMPLE 3

| | | | |
|---|---|---|---|
| $r_1 = 325.405$ | $d_1 = 1.00$ | $n_{d1} = 2.00069$ | $\nu_{d1} = 25.46$ |
| $r_2 = 27.199$ | $d_2 = 0.10$ | | |
| $r_3 = 15.067$ (Aspheric) | $d_3 = 4.27$ | $n_{d2} = 1.77377$ | $\nu_{d2} = 47.17$ |
| $r_4 = -38.403$ (Aspheric) | $d_4 =$ (Variable) | | |
| $r_5 = -16.420$ (Aspheric) | $d_5 = 0.80$ | $n_{d3} = 1.80610$ | $\nu_{d3} = 40.92$ |
| $r_6 = 7.005$ (Aspheric) | $d_6 = 3.04$ | | |
| $r_7 = 20.739$ | $d_7 = 1.78$ | $n_{d4} = 1.94595$ | $\nu_{d4} = 17.98$ |
| $r_8 = 160.814$ | $d_8 =$ (Variable) | | |
| $r_9 = \infty$ (Stop) | $d_9 = 0.10$ | | |
| $r_{10} = 6.981$ (Aspheric) | $d_{10} = 3.81$ | $n_{d5} = 1.58913$ | $\nu_{d5} = 61.14$ |
| $r_{11} = -36.565$ (Aspheric) | $d_{11} = 0.10$ | | |
| $r_{12} = 7.062$ (Aspheric) | $d_{12} = 2.72$ | $n_{d6} = 1.80610$ | $\nu_{d6} = 40.92$ |
| $r_{13} = -57.657$ | $d_{13} = 0.52$ | $n_{d7} = 2.00069$ | $\nu_{d7} = 25.46$ |
| $r_{14} = 4.263$ | $d_{14} =$ (Variable) | | |
| $r_{15} = 11.540$ (Aspheric) | $d_{15} = 2.30$ | $n_{d8} = 1.74330$ | $\nu_{d8} = 49.33$ |
| $r_{16} = 62.647$ | $d_{16} =$ (Variable) | | |
| $r_{17} = \infty$ | $d_{17} = 0.50$ | $n_{d9} = 1.54771$ | $\nu_{d9} = 62.84$ |
| $r_{18} = \infty$ | $d_{18} = 0.60$ | | |
| $r_{19} = \infty$ | $d_{19} = 0.60$ | $n_{d10} = 1.51633$ | $\nu_{d10} = 64.14$ |
| $r_{20} = \infty$ | $d_{20} = 0.36$ | | |
| $r_{21} = \infty$ (Imaging plane) | | | |

Aspherical Coefficients

3rd surface $K = -0.413$
$A_4 = -1.62992 \times 10^{-5}$
$A_6 = -1.56441 \times 10^{-7}$
$A_8 = 2.11010 \times 10^{-9}$
$A_{10} = -8.78346 \times 10^{-12}$ -continued 4th surface K = −9.142
$A_4 = -5.96973 \times 10^{-7}$
$A_6 = -4.80555 \times 10^{-8}$
$A_8 = 1.47942 \times 10^{-9}$
$A_{10} = -6.75206 \times 10^{-12}$ 5th surface K = −0.720
$A_4 = 2.01103 \times 10^{-5}$
$A_6 = 3.69048 \times 10^{-6}$
$A_8 = -5.35288 \times 10^{-8}$
$A_{10} = 2.68214 \times 10^{-10}$ 6th surface K = −0.713
$A_4 = -2.86652 \times 10^{-4}$
$A_6 = 3.67021 \times 10^{-6}$
$A_8 = 6.89531 \times 10^{-8}$
$A_{10} = -1.37487 \times 10^{-9}$ 10th surface K = 0.199
$A_4 = -2.13259 \times 10^{-4}$
$A_6 = -3.81513 \times 10^{-6}$
$A_8 = 2.31037 \times 10^{-9}$
$A_{10} = -1.84701 \times 10^{-9}$ 11th surface K = 0.000
$A_4 = 2.99129 \times 10^{-5}$
$A_6 = 1.41415 \times 10^{-5}$
$A_8 = -6.42403 \times 10^{-7}$
$A_{10} = 1.38786 \times 10^{-8}$ 12th surface K = 0.000
$A_4 = -2.40610 \times 10^{-4}$
$A_6 = 3.55181 \times 10^{-6}$
$A_8 = -2.99979 \times 10^{-7}$
$A_{10} = -1.20631 \times 10^{-8}$ 15th surface K = 0.000
$A_4 = -3.62021 \times 10^{-5}$
$A_6 = 4.44206 \times 10^{-6}$
$A_8 = -7.43421 \times 10^{-8}$
$A_{10} = 2.82397 \times 10^{-10}$ Zooming Data (∞)

|  | WE | ST | TE |
|---|---|---|---|
| f (mm) | 6.53 | 14.30 | 31.35 |
| $F_{NO}$ | 1.84 | 2.16 | 2.54 |
| 2ω (°) | 69.37 | 29.94 | 13.66 |
| $d_4$ | 0.95 | 6.21 | 11.54 |
| $d_8$ | 18.14 | 7.29 | 1.35 |
| $d_{14}$ | 3.40 | 4.17 | 10.53 |
| $d_{16}$ | 3.86 | 5.80 | 2.98 |

EXAMPLE 4

| $r_1 = -161.991$ | $d_1 = 0.90$ | $n_{d1} = 1.80495$ | $v_{d1} = 40.82$ |
| $r_2 = 6.913$ (Aspheric) | $d_2 = 0.99$ | | |
| $r_3 = 8.642$ | $d_3 = 2.00$ | $n_{d2} = 2.00069$ | $v_{d2} = 25.46$ |
| $r_4 = 16.041$ | $d_4$ = (Variable) | | |
| $r_5 = \infty$ (Stop) | $d_5 = -0.63$ | | |
| $r_6 = 4.954$ (Aspheric) | $d_6 = 1.96$ | $n_{d3} = 1.80580$ | $v_{d3} = 40.70$ |
| $r_7 = 1516.267$ | $d_7 = 1.23$ | $n_{d4} = 1.84666$ | $v_{d4} = 23.78$ |
| $r_8 = 5.425$ | $d_8 = 1.82$ | $n_{d5} = 1.58233$ | $v_{d5} = 59.30$ |
| $r_9 = 9.657$ (Aspheric) | $d_9$ = (Variable) | | |
| $r_{10} = 7.546$ (Aspheric) | $d_{10} = 1.53$ | $n_{d6} = 1.53113$ | $v_{d6} = 55.80$ |

-continued

| $r_{11} = 10.842$ | $d_{11}$ = (Variable) | | |
| $r_{12} = \infty$ | $d_{12} = 0.50$ | $n_{d7} = 1.51633$ | $v_{d7} = 64.14$ |
| $r_{13} = \infty$ | $d_{13} = 0.50$ | | |
| $r_{14} = \infty$ | $d_{14} = 0.50$ | $n_{d8} = 1.51633$ | $v_{d8} = 64.14$ |
| $r_{15} = \infty$ | $d_{15} = 0.44$ | | |
| $r_{16} = \infty$ (Imaging plane) | | | |

Aspherical Coefficients

2nd surface

K = −3.870
$A_4 = 1.41073 \times 10^{-3}$
$A_6 = -2.69982 \times 10^{-5}$
$A_8 = 5.40138 \times 10^{-7}$
$A_{10} = -3.54775 \times 10^{-9}$ 6th surface K = −4.078
$A_4 = 4.18707 \times 10^{-3}$
$A_6 = -1.93051 \times 10^{-4}$
$A_8 = 1.49474 \times 10^{-5}$
$A_{10} = -5.15576 \times 10^{-7}$ 9th surface K = 0.544
$A_4 = 3.86999 \times 10^{-3}$
$A_6 = 4.32859 \times 10^{-5}$
$A_8 = 4.91914 \times 10^{-5}$
$A_{10} = 1.74369 \times 10^{-7}$ 10th surface K = 0.000
$A_4 = -1.91072 \times 10^{-4}$
$A_6 = 2.67762 \times 10^{-5}$
$A_8 = -2.37736 \times 10^{-6}$
$A_{10} = 9.64213 \times 10^{-8}$ Zooming Data (∞)

|  | WE | ST | TE |
|---|---|---|---|
| f (mm) | 7.53 | 13.03 | 21.64 |
| $F_{NO}$ | 2.88 | 3.65 | 4.85 |
| 2ω (°) | 71.26 | 40.12 | 24.16 |
| $d_4$ | 14.53 | 5.73 | 0.93 |
| $d_9$ | 4.20 | 4.80 | 5.98 |
| $d_{11}$ | 3.59 | 6.48 | 11.02 |

EXAMPLE 5

| $r_1 = -29.489$ (Aspheric) | $d_1 = 0.85$ | $n_{d1} = 1.77250$ | $v_{d1} = 49.60$ |
| $r_2 = 11.494$ (Aspheric) | $d_2 = 0.87$ | | |
| $r_3 = 20.115$ | $d_3 = 2.00$ | $n_{d2} = 2.00330$ | $v_{d2} = 28.27$ |
| $r_4 = 244.527$ | $d_4$ = (Variable) | | |
| $r_5 = \infty$ (Stop) | $d_5 = 0.95$ | | |
| $r_6 = 8.020$ (Aspheric) | $d_6 = 2.47$ | $n_{d3} = 1.58233$ | $v_{d3} = 59.40$ |
| $r_7 = -40.089$ (Aspheric) | $d_7 = 0.15$ | | |
| $r_8 = 9.274$ | $d_8 = 2.80$ | $n_{d4} = 1.88300$ | $v_{d4} = 40.76$ |
| $r_9 = -3028.174$ | $d_9 = 0.50$ | $n_{d5} = 1.78472$ | $v_{d5} = 25.68$ |
| $r_{10} = 4.809$ | $d_{10}$ = (Variable) | | |
| $r_{11} = 22.283$ | $d_{11} = 1.68$ | $n_{d6} = 1.74330$ | $v_{d6} = 49.33$ |
| $r_{12} = -65.895$ (Aspheric) | $d_{12}$ = (Variable) | | |
| $r_{13} = -24.255$ (Aspheric) | $d_{13} = 1.00$ | $n_{d7} = 1.52542$ | $v_{d7} = 55.78$ |
| $r_{14} = -14.133$ (Aspheric) | $d_{14}$ = (Variable) | | |
| $r_{15} = \infty$ | $d_{15} = 0.50$ | $n_{d8} = 1.51633$ | $v_{d8} = 64.14$ |
| $r_{16} = \infty$ | $d_{16} = 0.50$ | | |

-continued $r_{17} = \infty$     $d_{17} = 0.50$     $n_{d9} = 1.51633$     $v_{d9} = 64.14$
$r_{18} = \infty$     $d_{18} = 0.44$
$r_{19} = \infty$ (Imaging plane)

Aspherical Coefficients

1st surface

K = 0.000
$A_4 = -1.69022 \times 10^{-4}$
$A_6 = 3.81608 \times 10^{-6}$
$A_8 = -2.61953 \times 10^{-8}$
$A_{10} = -2.43105 \times 10^{-12}$
$A_{12} = 3.79084 \times 10^{-14}$
2nd surface K = −1.444
$A_4 = -1.93476 \times 10^{-4}$
$A_6 = 4.60911 \times 10^{-6}$
$A_8 = -4.34788 \times 10^{-8}$
$A_{10} = 6.66389 \times 10^{-10}$
$A_{12} = -8.53759 \times 10^{-12}$
6th surface K = −0.075
$A_4 = -2.08260 \times 10^{-4}$
$A_6 = 1.87850 \times 10^{-6}$
$A_8 = -2.92497 \times 10^{-7}$
$A_{10} = 1.16787 \times 10^{-8}$
7th surface K = 0.000
$A_4 = 1.18030 \times 10^{-4}$
$A_6 = -9.91336 \times 10^{-8}$
$A_8 = -1.33341 \times 10^{-7}$
$A_{10} = 1.03182 \times 10^{-8}$
12th surface K = 0.000
$A_4 = -1.02018 \times 10^{-4}$
$A_6 = 6.11413 \times 10^{-6}$
$A_8 = -1.60498 \times 10^{-7}$
$A_{10} = 3.08977 \times 10^{-10}$
13th surface K = 0.000
$A_4 = 1.34327 \times 10^{-3}$
$A_6 = -2.38101 \times 10^{-5}$
$A_8 = 3.14569 \times 10^{-6}$
$A_{10} = -8.47907 \times 10^{-8}$
14th surface K = 0.000
$A_4 = 2.89973 \times 10^{-3}$
$A_6 = -1.11093 \times 10^{-4}$
$A_8 = 7.73839 \times 10^{-6}$
$A_{10} = -1.66208 \times 10^{-7}$ Zooming Data (∞)

|  | WE | ST | TE |
|---|---|---|---|
| f (mm) | 8.04 | 13.59 | 23.24 |
| $F_{NO}$ | 1.84 | 2.35 | 3.51 |
| 2ω (°) | 61.20 | 36.31 | 21.48 |
| $d_4$ | 15.41 | 5.04 | 0.74 |
| $d_{10}$ | 4.35 | 7.69 | 18.75 |
| $d_{12}$ | 1.20 | 4.08 | 1.83 |
| $d_{14}$ | 2.80 | 1.05 | 0.80 |

Aberration diagrams for Examples 1 to 5 upon focusing on an object point at infinity are shown in FIGS. 8 to 12, respectively, indicative of spherical aberrations, astigmatisms, distortion and chromatic aberrations of magnification at the wide-angle end (a), in the intermediate state (b) and at the telephoto end (c). In the respective aberration diagrams, "FIY" stands for an image height in mm.

Set out below are the values of conditions (1) to (6) in Examples 1 to 5.

|  | Ex. 1 | Ex. 2 | Ex. 3 | Ex. 4 | Ex. 5 |
|---|---|---|---|---|---|
| Cond. (1) | 4.82 | 5.28 | 4.24 | 5.74 | 5.54 |
| Cond. (2) | 9.79 | 12.24 | 8.50 | 11.39 | 10.30 |
| Cond. (3) | −6.82 | −8.42 | −6.22 | −17.41 | −17.39 |
| Cond. (4) | 1.01 | 1.42 | 0.91 | 1.55 | 1.85 |
| Cond. (5) | 0.61 | 1.08 | 0.64 | 1.38 | 1.58 |
| Cond. (6) | −0.38 | −0.70 | −0.32 | −1.44 | −0.93 |

I claim:

1. An imaging apparatus adapted to implement electrical image restoration processing, characterized by comprising:
    a zoom lens comprising a plurality of lens groups and adapted to implement zooming from a wide-angle end to a telephoto end with a change in a space between said plurality of lens groups,
    an imaging device having an imaging plane located at a position where an image formed by said zoom lens is received at, and adapted to take said image, and
    an image restoration processor adapted to implement signal processing by which image restoration is implemented on the basis of a signal for the image taken by said imaging device to generate an image signal for a restored image, wherein:
    the signal processing for implementing said image restoration at said image restoration processor involves processing for electrically implementing image restoration using a restoration filter on the basis of a point spread function regarding an imaging capability of said zoom lens, and
    said zoom lens and said imaging device have a relation that satisfies the following condition (1):

$$2 < (L \cdot f_w \cdot \sqrt{Fno})/(f_t \cdot Ih) < 7 \tag{1}$$

where:
    L is an axial maximum length from the refracting surface of the zoom lens nearest to the object side to the imaging plane,
    $f_w$ is a focal length of the whole zoom lens system at the wide-angle end,
    $f_t$ is a focal length of the whole zoom lens system at the telephoto end,
    Fno is a minimum F-number at the telephoto end, and
    Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

2. The imaging apparatus adapted to implement electrical image restoration processing according to claim 1, wherein said zoom lens and said imaging device have a relation that satisfies the following condition (2):

$$5 < f_{GPmax} \cdot Fno/Ih < 15 \tag{2}$$

where:
    $f_{GPmax}$ is a focal length of a lens group of the plurality of lens groups in the zoom lens, wherein said lens group has a greatest positive refracting power.

3. The imaging apparatus adapted to implement electrical image restoration processing according to claim 1, wherein the signal processing for implementing said image restoration at said image restoration processor involves processing for electrically implementing image restoration by deconvolution computation using said restoration filter.

4. The imaging apparatus adapted to implement electrical image restoration processing according to claim 3, wherein the image restoration processing at said image restoration processor involves processing for implementing repetitive computation using said restoration filter.

5. The imaging apparatus adapted to implement electrical image restoration processing according to claim 1, wherein said zoom lens comprises a negative lens group that satisfies the following condition (3):

$$4<|f_{GNmax} \cdot Fno/Ih|<25 \tag{3}$$

where $f_{GNmax}$ is a focal length of a lens group of the plurality of lens groups in the zoom lens, wherein said lens group has a greatest negative refracting power.

6. The imaging apparatus adapted to implement electrical image restoration processing according to claim 1, wherein said zoom lens and said imaging device have a relation that satisfies the following condition (4):

$$0.5<(D_{zmax} \cdot f_w \cdot \sqrt{Fno})/(f_t \cdot Ih)<2 \tag{4}$$

where $D_{zmax}$ is an amount of movement of a lens group of the plurality of lens groups in the zoom lens, wherein said lens group has the greatest amount of movement upon zooming from the wide-angle end to the telephoto end, $f_w$ is a focal length of the whole zoom lens system at the wide-angle end, and $f_t$ is a focal length of the whole zoom lens system at the telephoto end.

7. The imaging apparatus adapted to implement electrical image restoration processing according to claim 1, wherein said zoom lens comprises a negative lens group that satisfies the following condition (5):

$$0.3<f_{LPmax} \cdot Fno/f_t<2 \tag{5}$$

where $f_{LPmax}$ is a focal length of a positive lens having the greatest positive refracting power in the zoom lens, and $f_t$ is a focal length of the whole zoom lens system at the telephoto end.

8. The imaging apparatus adapted to implement electrical image restoration processing according to claim 1, wherein said zoom lens comprises a negative lens group that satisfies the following condition (6):

$$0.15<|f_{LNmax} \cdot Fno/f_t|<1.65 \tag{6}$$

where $f_{LNmax}$ is a focal length of a negative lens having the greatest negative refracting power in the zoom lens, and $f_t$ is a focal length of the whole zoom lens system at the telephoto end.

9. The imaging apparatus adapted to implement electrical image restoration processing according to claim 1, which comprises an information holder for holding information on said point spread function regarding the imaging capability of said zoom lens, wherein said image restoration processor implements image restoration while taking said information held in said information holder into consideration.

10. The imaging apparatus adapted to implement electrical image restoration processing according to claim 1, which implements image restoration using information on the point spread function that differs depending on a zooming state of said zoom lens.

11. The imaging apparatus adapted to implement electrical image restoration processing according to claim 10, which comprises an information holder for holding information on the point spread function that differs depending on a zooming state of said zoom lens, wherein said image restoration processor implements image restoration while taking said information held in said information holder into consideration.

12. The imaging apparatus adapted to implement electrical image restoration processing according to claim 1, which implements image restoration using information on the point spread function that differs depending on a position on said imaging plane.

13. The imaging apparatus adapted to implement electrical image restoration processing according to claim 12, which comprises an information holder for holding information on the point spread function that differs depending on a position on said imaging plane, wherein said image restoration processor implements image restoration while taking said information held in said information holder into consideration.

14. The imaging apparatus adapted to implement electrical image restoration processing according to claim 1, which implements image restoration using information on the point spread function that differs depending on a focusing state of said zoom lens.

15. The imaging apparatus adapted to implement electrical image restoration processing according to claim 14, which comprises an information holder for holding information on the point spread function that differs depending on a focusing state of said zoom lens, wherein said image restoration processor implements image restoration while taking said information held in said information holder into consideration.

16. An imaging apparatus adapted to implement electrical image restoration processing, characterized by comprising:

a zoom lens comprising a plurality of lens groups and adapted to implement zooming from a wide-angle end to a telephoto end with a change in a space between said plurality of lens groups, an imaging device having an imaging plane located at a position where an image formed by said zoom lens is received at, and adapted to take said image, and an image restoration processor adapted to implement signal processing by which image restoration is implemented on the basis of a signal for the image taken by said imaging device to generate an image signal for a restored image, wherein:

said zoom lens and said imaging device have a relation that satisfies the following condition (1):

$$2<(L \cdot f_w \cdot \sqrt{Fno})/(f_t \cdot Ih)<7 \tag{1}$$

where:

L is an axial maximum length from the refracting surface of the zoom lens nearest to the object side to the imaging plane, $f_w$ is a focal length of the whole zoom lens system at the wide-angle end, $f_t$ is a focal length of the whole zoom lens system at the telephoto end, Fno is a minimum F-number at the telephoto end, and Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

17. The imaging apparatus adapted to implement electrical image restoration processing according to claim 16, wherein said zoom lens comprises a negative lens group that satisfies the following condition (3):

$$4<|f_{GNmax} \cdot Fno/Ih|<25 \tag{3}$$

where $f_{GNmax}$ is a focal length of a lens group of the plurality of lens groups in the zoom lens, wherein said lens group has a greatest negative refracting power.

18. The imaging apparatus adapted to implement electrical image restoration processing according to claim 16, wherein said zoom lens and said imaging device have a relation that satisfies the following condition (4):

$$0.5 < (D_{zmax} \cdot f_w \cdot \sqrt{Fno})/(f_t \cdot Ih) < 2 \quad (4)$$

where
- $D_{zmax}$ is an amount of movement of a lens group of the plurality of lens groups in the zoom lens, wherein said lens group has the greatest amount of movement upon zooming from the wide-angle end to the telephoto end,
- $f_w$ is a focal length of the whole zoom lens system at the wide-angle end, and
- $f_t$ is a focal length of the whole zoom lens system at the telephoto end.

19. The imaging apparatus adapted to implement electrical image restoration processing according to claim 16, wherein said zoom lens comprises a negative lens group that satisfies the following condition (5):

$$0.3 < f_{LPmax} \cdot Fno/f_t < 2 \quad (5)$$

where $f_{Lpmax}$ is a focal length of a positive lens having the greatest positive refracting power in the zoom lens, and
- $f_t$ is a focal length of the whole zoom lens system at the telephoto end.

20. The imaging apparatus adapted to implement electrical image restoration processing according to claim 16, wherein said zoom lens comprises a negative lens group that satisfies the following condition (6):

$$0.15 < |f_{LNmax} \cdot Fno/f_t| < 1.65 \quad (6)$$

where $f_{LNmax}$ is a focal length of a negative lens having the greatest negative refracting power in the zoom lens, and
- $f_t$ is a focal length of the whole zoom lens system at the telephoto end.

21. An imaging apparatus adapted to implement electrical image restoration processing, characterized by comprising:
- a zoom lens comprising a plurality of lens groups and adapted to implement zooming from a wide-angle end to a telephoto end with a change in a space between said plurality of lens groups,
- an imaging device having an imaging plane located at a position where an image formed by said zoom lens is received at, and adapted to take said image, and
- an image restoration processor adapted to implement signal processing by which image restoration is implemented on the basis of a signal for the image taken by said imaging device to generate an image signal for a restored image, wherein:
- the signal processing for implementing said image restoration at said image restoration processor involves processing for electrically implementing image restoration using a restoration filter on the basis of a point spread function regarding an imaging capability of said zoom lens, and
- said zoom lens and said imaging device have a relation that satisfies the following condition (2):

$$5 < f_{GPmax} \cdot Fno/Ih < 15 \quad (2)$$

where:
- $f_{GPmax}$ is a focal length of a lens group of the plurality of lens groups in the zoom lens, wherein said lens group has a greatest positive refracting power,
- Fno is a minimum F-number at the telephoto end, and
- Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

22. An imaging apparatus adapted to implement electrical image restoration processing, characterized by comprising:
- a zoom lens comprising a plurality of lens groups and adapted to implement zooming from a wide-angle end to a telephoto end with a change in a space between said plurality of lens groups,
- an imaging device having an imaging plane located at a position where an image formed by said zoom lens is received at, and adapted to take said image, and
- an image restoration processor adapted to implement signal processing by which image restoration is implemented on the basis of a signal for the image taken by said imaging device to generate an image signal for a restored image, wherein:
- said zoom lens and said imaging device have a relation that satisfies the following condition (2):

$$5 < f_{GPmax} \cdot Fno/Ih < 15 \quad (2)$$

where:
- $f_{GPmax}$ is a focal length of a lens group of the plurality of lens groups in the zoom lens, wherein said lens group has a greatest positive refracting power,
- Fno is a minimum F-number at the telephoto end, and
- Ih is one-half the diagonal length of an effective imaging area on the imaging plane, provided that the effective imaging area is a maximum area used for image display in an area on said imaging plane with said image formed on it, and when said zoom lens has a focusing function, each value is found upon focusing on an axially farthest object.

* * * * *